United States Patent
Iwai et al.

(10) Patent No.: US 10,123,302 B2
(45) Date of Patent: Nov. 6, 2018

(54) PAGING CONTROL APPARATUS, PAGING METHOD, WIRELESS TERMINAL, AND NON-TRANSITORY COMPUTER-READABLE MEDIUM

(71) Applicant: NEC Corporation, Tokyo (JP)

(72) Inventors: Takanori Iwai, Tokyo (JP); Hajime Zembutsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/415,773

(22) PCT Filed: May 28, 2013

(86) PCT No.: PCT/JP2013/003362
§ 371 (c)(1),
(2) Date: Jan. 20, 2015

(87) PCT Pub. No.: WO2014/013660
PCT Pub. Date: Jan. 23, 2014

(65) Prior Publication Data
US 2015/0215895 A1    Jul. 30, 2015

(30) Foreign Application Priority Data
Jul. 20, 2012    (JP) .................................. 2012-161407

(51) Int. Cl.
*H04W 68/00*    (2009.01)
*H04W 68/02*    (2009.01)
(Continued)

(52) U.S. Cl.
CPC ......... *H04W 68/02* (2013.01); *H04W 68/005* (2013.01); *H04W 68/04* (2013.01); *H04W 60/00* (2013.01)

(58) Field of Classification Search
None
See application file for complete search history.

(56) References Cited

U.S. PATENT DOCUMENTS 8,855,686 B1 * 10/2014 Oroskar ................ H04W 68/04
455/434
2005/0272465 A1    12/2005 Ahmavaara et al.
(Continued)

FOREIGN PATENT DOCUMENTS

EP    2 665 318 A1    11/2013
JP    8-336180    12/1996
(Continued)

OTHER PUBLICATIONS

International Search Report dated Sep. 3, 2013 in corresponding PCT International Application.

(Continued)

*Primary Examiner* — Moustapha Diaby
(74) *Attorney, Agent, or Firm* — Finnegan, Henderson, Farabow, Garrett & Dunner, L.L.P.

(57) ABSTRACT

In one embodiment, a mobile communication system (1) includes a radio access network (200) and a core network (30). The core network (30) includes a paging control apparatus (300). The paging control apparatus (300) is configured to determine a paging area of a mobile terminal (100) based on an external network (9) with which the mobile terminal communicates through the radio access network (200) and the core network (30).

20 Claims, 16 Drawing Sheets

(51) Int. Cl.
*H04W 68/04* (2009.01)
*H04W 60/00* (2009.01)

(56) References Cited

U.S. PATENT DOCUMENTS

| | | | | |
|---|---|---|---|---|
| 2006/0217118 | A1* | 9/2006 | Benco | H04W 68/00 455/435.1 |
| 2007/0077947 | A1* | 4/2007 | Rossetti | H04W 68/00 455/458 |
| 2007/0104156 | A1* | 5/2007 | Inoue | H04W 68/00 370/338 |
| 2008/0119209 | A1* | 5/2008 | Upp | H04W 68/02 455/458 |
| 2009/0149177 | A1* | 6/2009 | Machida | H04W 60/02 455/435.1 |
| 2009/0245240 | A1* | 10/2009 | Mao | H04L 45/00 370/352 |
| 2010/0208694 | A1* | 8/2010 | Kumai | H04W 68/12 370/331 |
| 2011/0007671 | A1* | 1/2011 | Yu | H04L 61/6086 370/255 |
| 2011/0053591 | A1 | 3/2011 | Kubo et al. | |
| 2011/0207481 | A1* | 8/2011 | Yin | H04W 36/0022 455/458 |
| 2012/0142278 | A1* | 6/2012 | Wang | H04W 36/0016 455/68 |
| 2012/0149383 | A1* | 6/2012 | Wang | H04W 68/02 455/450 |
| 2012/0270556 | A1* | 10/2012 | Yin | H04W 68/04 455/450 |
| 2013/0170438 | A1* | 7/2013 | Nishida | H04W 68/005 370/328 |

FOREIGN PATENT DOCUMENTS

| | | |
|---|---|---|
| JP | 2005-20726 | 1/2005 |
| JP | 2005-531216 | 10/2005 |
| JP | 2006-501739 | 1/2006 |
| JP | 2006-211335 | 8/2006 |
| JP | 2007-82142 | 3/2007 |
| JP | 2008-199395 | 8/2008 |
| JP | 2010-520712 | 6/2010 |
| JP | 2011-49616 | 3/2011 |
| WO | WO 2008/131165 A1 | 10/2008 |
| WO | WO 2010/033413 A1 | 3/2010 |

OTHER PUBLICATIONS

Extended European Search Report dated Feb. 24, 2016, by the European Patent Office in counterpart European Patent Application No. 13819488.1.
Notification of Reasons for Refusal issued by Japanese Patent Office dated Jun. 20, 2017, in counterpart Japanese application No. 2014-525691.
Official Communication issued by the European Patent Office in counterpart European Patent Application No. 13 819 488.1-1857, dated May 22, 2017.

* cited by examiner

| MSID (e.g. IMSI) | MOBILITY TYPE |
|---|---|
| ID1 | TYPE A (e.g. GENERAL USER) |
| ID2 | TYPE B (e.g. AUTOMOBILE) |
| ID3 | TYPE C (e.g. RAILWAY VEHICLE) |
| ID4 | TYPE D (e.g. VENDING MACHINE) |
| ⋮ | ⋮ |

US 10,123,302 B2

PAGING CONTROL APPARATUS, PAGING METHOD, WIRELESS TERMINAL, AND NON-TRANSITORY COMPUTER-READABLE MEDIUM

CROSS-REFERENCE TO RELATED PATENT APPLICATIONS

This application is a National Stage Entry of International Application No. PCT/JP2013/003362, filed May 28, 2013, which claims priority from Japanese Patent Application No. 2012-161407, filed Jul. 20, 2012. The entire contents of the above-referenced applications are expressly incorporated herein by reference.

TECHNICAL FIELD

The present invention relates to paging of a wireless terminal in a mobile communication system.

BACKGROUND ART

A multiple access mobile communication system enables a plurality of wireless terminals to perform radio communication substantially simultaneously, by sharing radio resources including at least one of time, frequency, and transmission power among the plurality of wireless terminals. Typical examples of multiple access schemes include TDMA (Time Division Multiple Access), FDMA (Frequency Division Multiple Access), CDMA (Code Division Multiple Access), OFDMA (Orthogonal Frequency Division Multiple Access), and any combination thereof.

The term "mobile communication system" used in the present specification refers to a multiple access mobile communication system unless otherwise specified. A mobile communication system includes wireless terminals and an upper network. The upper network includes base stations, relay nodes that relay traffic, and control nodes that perform radio resource management, mobility management, bearer management and the like.

When new downlink traffic (downlink data or incoming voice) to a wireless terminal in a standby state has arrived at an upper network, the upper network transmits a paging signal to the wireless terminal. The wireless terminal in the standby state performs a discontinuous reception (DRX) in order to receive a paging signal. Then the wireless terminal initiates, in response to reception of the paging signal addressed thereto, signaling to establish communication for receiving the downlink traffic. This signaling includes a response message to the paging. The response message includes one or both of a request for establishing a control connection and a service request for establishing a communication path (a bearer) that transfers user-data. In response to the response message, the network executes procedures for configuring the control connection and the communication path (bearer) required for transmitting the downlink traffic to the wireless terminal.

Note that, in paging a wireless terminal, an upper network needs to determine an area to which a paging signal is sent. In the present specification, the area to which a paging signal is sent is referred to as "the paging area". The paging area includes at least one cell, and generally includes a plurality of cells (or sectors). Typically, the paging area agrees with the latest location registration area to which the wireless terminal belongs. The location registration area is a management unit in the upper network of the wireless terminal in the standby state. The location registration area includes one or a plurality of cells. When the wireless terminal crosses over from one location registration area to another, the wireless terminal sends a location update message to the upper network. Further, the wireless terminal may periodically sends a location update message irrespective of occurrence of any change in the location registration area.

For example, in a packet exchanged domain of 3GPP (the 3rd Generation Partnership Project) UMTS (Universal Mobile Telecommunications System), a location registration area is referred to as a routing area (RA). Accordingly, paging of a wireless terminal in the standby state (CELL_PCH state or URA_PCH state) is generally performed by broadcasting a paging signal in the RA.

Further, in 3GPP EPS (Evolved Packet System) or LTE (Long Term Evolution), a location registration area is referred to as a tracking area (TA). Further, in the EPS, a wireless terminal can be assigned a plurality of TAs. Specifically, on the occasion of an initial attach or tracking area update (TAU: Tracking Area Update) of a wireless terminal, the wireless terminal is notified of a TA list including one or a plurality of TAs. Thus, a TA list is a unit of location management of a mobile terminal. Accordingly, paging of a wireless terminal in the standby state (RRC_IDLE (ECM_IDLE) state) is generally performed by broadcasting a paging signal in all the TAs included in the TA list.

Patent Literatures 1 and 2 disclose techniques of narrowing a paging area as compared to the general location registration area through use of a movement history of a wireless terminal. By narrowing a paging area, the paging load of a mobile communication system can be reduced.

Patent Literature 1 discloses calculating a movement distance (i.e., a moving speed) of a wireless terminal per unit time using a history of location update messages sent from the wireless terminal, and determining, as the paging area, base stations included in a circle whose radius is the calculated movement distance.

Patent Literature 2 discloses performing location management of a wireless terminal using not only location update messages but also location information by means of a GPS (Global Positioning System). The method disclosed in Patent Literature 2 includes determining, in the case where the latest location information of a wireless terminal received by the upper network is GPS location information, the paging area of a limited range as compared to the location registration area based on the GPS location information. Further, Patent Literature 2 discloses calculating a moving speed of a wireless terminal using a history of location update messages and that of GPS location information, and enlarging the paging area as the moving speed of the wireless terminal becomes faster. Specifically, in order to enlarge the paging area, an identifier for specifying the paging area is changed in order of a sector identifier, a radio network controller (RNC) identifier, and a RAI (Routing Area Indicator).

Patent Literature 3 discloses determining a paging area of a wireless terminal in accordance with a communication state (e.g., communication quantity) or an operating state (e.g., movement frequency) of the wireless terminal. Specifically, the wireless terminal disclosed in Patent Literature 3 monitors its communication state (e.g., communication quantity) and operating state (e.g., movement frequency), and sends a control packet (paging request packet) to a core network. The core network in Patent Literature 3 receives the control packet (paging request packet) from the wireless terminal, and determines the paging area of the wireless terminal in accordance with the communication state or operating state thereof indicated by the control packet.

Patent Literature 4 discloses that a base station determines a mobility state of a wireless terminal, and determines a tracking area (TA) to be assigned to the wireless terminal based on the determined mobility state. For example, in an architecture in which a wireless terminal can be assigned a plurality of TAs, the network assigns one TA to a wireless terminal in a stationary state or a low mobility state, and assigns a plurality of TAs to a wireless terminal in a high mobility state. Alternatively, in an architecture where a cell can belong to a plurality of TAs, the network assigns a TA that covers a small geographical area to a wireless terminal in the stationary state or the low mobility state, and assigns a TA that covers a large geographical area to a wireless terminal in the high mobility state. Further, Patent Literature 4 discloses, for the purpose of determining the mobility state of a wireless terminal, use of at least one of: (a) a measured value of the number of tracking area updates (TAUs) of the wireless terminal; (b) a measured value of the number of cell reselections executed by the wireless terminal; and (c) measurement results of a position (e.g., longitude and latitude) of the wireless terminal. Note that, in Patent Literature 4, a TA and a paging area are in a one-to-one correspondence with each other, and paging of a wireless terminal is performed on one or a plurality of TAs assigned to the wireless terminal.

Patent Literature 5 discloses a communication method including the following steps (a) to (c):

(a) sending, from the wireless terminal to a communication network, an indicator explicitly indicating that a wireless terminal (typically an M2M (machine-to-machine) device) is in low mobility;

(b) informing, by the wireless terminal, the communication network about a location (typically a sector) of the wireless terminal; and (c) sending a paging message to an area limited to the location (typically a sector) informed by the wireless terminal.

CITATION LIST

Patent Literature

[Patent Literature 1] Japanese Unexamined Patent Application Publication No. 2011-49616

[Patent Literature 2] Japanese Unexamined Patent Application Publication No. 2006-211335

[Patent Literature 3] Japanese Unexamined Patent Application Publication No. 2005-20726

[Patent Literature 4] Published Japanese Translation of PCT International Publication for Patent Application, No. 2010-520712

[Patent Literature 5] United States Patent Publication No. 2012/0149383

SUMMARY OF INVENTION

Technical Problem

The present inventor has conducted a thorough study of a situation in which MTC (Machine Type Communication) is implemented in a mobile communication system. MTC is also referred to as M2M (Machine-to-Machine) communication or sensor network communication. When MTC is implemented in a mobile communication system, a wireless terminal function is arranged in an MTC device such as a machine (e.g., a vending machine, a smart meter, an automobile, and a railway vehicle) or a sensor (e.g., a sensor relating to environment, agriculture, transportation). Then, a monitoring system (i.e., a computer) arranged at a monitoring center such as a data center collects information retained within those machine or sensor (e.g., sales information, inventory information, or sensor measured information) through the radio communication system.

In some applications (e.g., smart metering), an MTC device (or an M2M device) can be regarded as having substantially no mobility. Further, in some other applications (e.g., a vending machine, a robot used in a building such as a hospital or a factory, and an agriculture machine), the mobility can be regarded as being fairly small if it is not zero. Such MTC applications can be referred to as "low-mobility communication", and such MTC devices can be referred to as "low-mobility terminals". In the present specification, the term "low mobility" refers to the case where a wireless terminal does not substantially move, the case where a wireless terminal does not frequently move, the case where a wireless terminal moves only in a limited small geographical region (e.g., in a building or in a factory) and the like. Further, the term "low-mobility communication" refers to communication performed by a low-mobility terminal.

The present inventor has found various problems as to paging of a wireless terminal including a low-mobility terminal. The technical idea found by the inventor to cope with the problems contributes toward improving paging of a wireless terminal. Specific examples of the technical idea will become apparent by the following description of embodiments and accompanying drawings.

Solution to Problem

In an aspect, a paging control apparatus is configured to determine a paging area of a wireless terminal based on an external network with which the wireless terminal communicates through a radio access network and a core network.

In an aspect, a paging method includes transmitting a paging message addressed to a wireless terminal to a paging area determined based on an external network with which the wireless terminal communicates through a radio access network and a core network.

In an aspect, a paging control apparatus is configured to acquire subscriber data containing low-mobility information of a wireless terminal from a subscriber server, and to determine a paging area of the wireless terminal based on the low-mobility information.

In an aspect, a paging method includes acquiring subscriber data containing low-mobility information of a wireless terminal from a subscriber server, and transmitting a paging message addressed to the wireless terminal to a paging area determined based on the low-mobility information.

In an aspect, a paging control apparatus is configured to determine, when a wireless terminal is determined as being in low mobility, a paging area covering a smaller geographical region as compared to a case where the wireless terminal is not in low mobility. The paging area includes a cell or sector where the wireless terminal was located last, and a cell or sector adjacent thereto.

In an aspect, a paging method includes transmitting, when a wireless terminal is determined as being in low mobility, a paging message addressed to the wireless terminal to a paging area covering a smaller geographical region as compared to a case where the wireless terminal is not in low mobility. The paging area includes a cell or sector where the wireless terminal was located last, and a cell or sector adjacent thereto.

In an aspect, a paging control apparatus includes a setting unit and a transmitting unit. The setting unit is configured to newly set, in response to an attach request message or a location update message from a wireless terminal, a first location registration area including a cell or sector through which the attach request message or the location update message was transmitted, and to notify the wireless terminal of the first location registration area. The transmitting unit is configured to transmit a paging message addressed to the wireless terminal to the first location registration area.

In an aspect, a paging method includes:

(a) newly setting, in response to reception of an attach request message or a location update message from a wireless terminal, a first location registration area including a cell or sector through which the attach request message or the location update message was transmitted;

(b) notifying the wireless terminal of the first location registration area; and (c) transmitting a paging message addressed to the wireless terminal to the first location registration area.

Advantageous Effects of Invention

The aspects described above can contribute toward improving paging of a wireless terminal.

DESCRIPTION OF EMBODIMENTS

Figure 1:
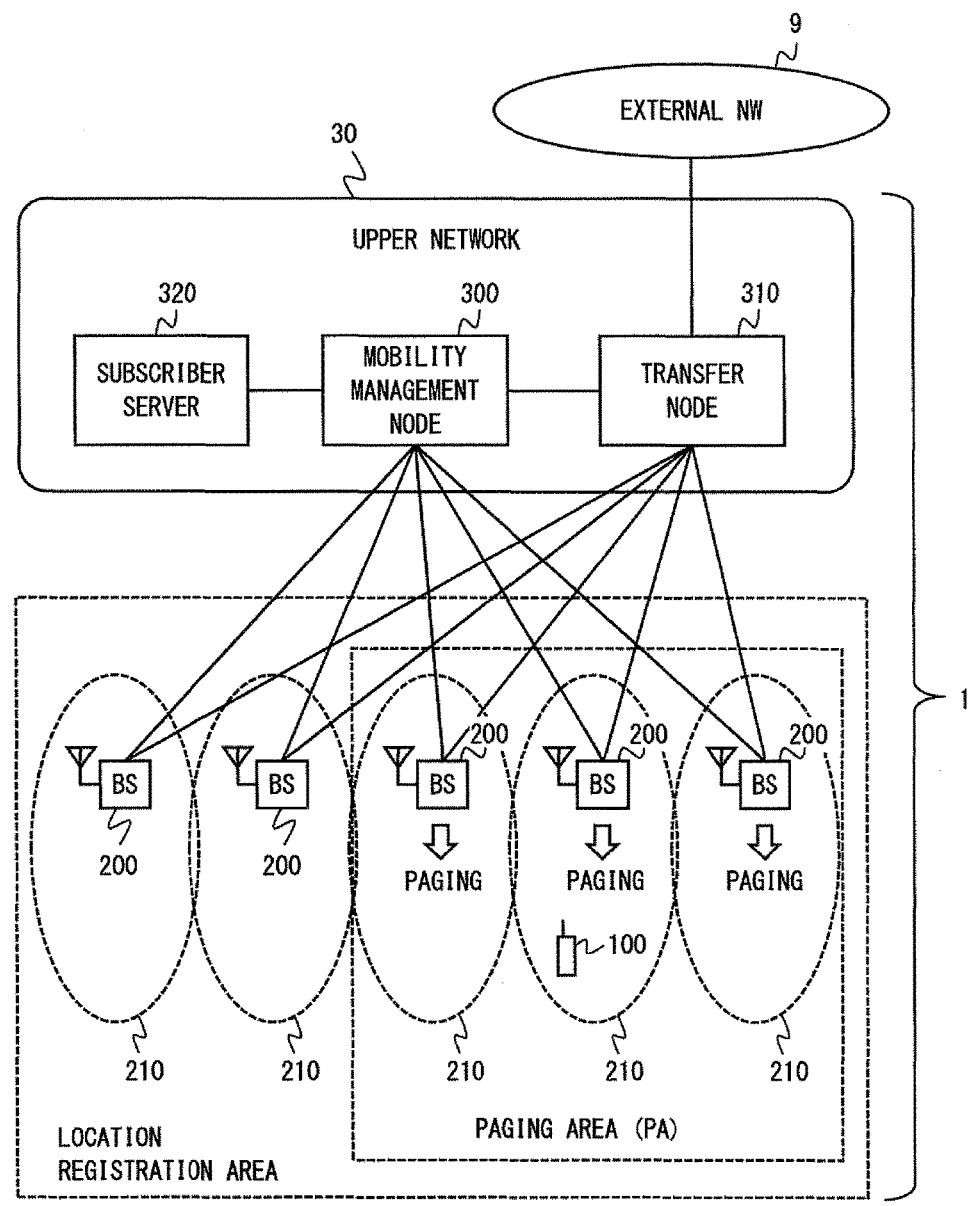
FIG. 1 is a diagram showing an illustrative configuration of mobile communication systems according to first to fourth embodiments.

In the following, specific embodiments will be detailed with reference to the drawings. In the drawings, the same or corresponding elements are denoted by the same reference numerals, and a repetitive description will be omitted as necessary for the sake of clarity.

First Embodiment

FIG. 1 shows an exemplary structure of a mobile communication system 1 according to several embodiments including the first present embodiment. The mobile communication system 1 includes a wireless terminal 100, base stations 200, and an upper network 30. Note that, though FIG. 1 shows only one wireless terminal 100 for the sake of convenience, the system 1 may include a plurality of wireless terminals 100. The base stations 200 each generate a cell 210, and establish a connection with the wireless terminal 100 by means of a radio access technology to relay user data between the wireless terminal 100 and the upper network 30. Note that, in the following description, the cell 210 may be a sector. Thus, the wireless terminal 1 communicates with an external network 9 through any one of the base stations 200 and the upper network 30, in other words, through a radio access network and a core network.

The upper network 30 is communicatively connected to the base stations 200, and has a function of relaying user data transferred between the wireless terminal 100 and the external network 9. Further, the upper network 30 performs subscriber data management and mobility management relating to the wireless terminal 100. The mobility management includes location management of the wireless terminal 100, and paging of the wireless terminal 100 in the standby state. The upper network 30 is a network mainly administrated by an operator providing mobile communication services. For example, the upper network 30 includes a core network (e.g., EPC (Evolved Packet Core), UMTS packet core). Further, the upper network 30 may include nodes (e.g., RNCs) of a radio access network excluding the plurality of base stations 200.

In the example shown in FIG. 1, the upper network 30 includes a mobility management node 300, a transfer node 310, and a subscriber server 320. The transfer node 310 is a user-plane node, and performs transfer processing (e.g., routing and forwarding) of user data. Note that, the transfer node 310 may include a plurality of transfer nodes. For example, in the case of the UMTS, the transfer node 310 includes the user-plane function of an SGSN (Serving GPRS Support Node) and the user-plane function of a GGSN (Gateway GPRS Support Node). Further, in the case of the EPS, the transfer node 310 includes an S-GW (Serving Gateway) and a P-GW (Packet Data Network Gateway).

The subscriber server 320 is a database that retains the subscriber data of the wireless terminal 100, and may refer to an HSS (Home Subscriber Server) or an HLR (Home Location Server). The subscriber server 320 sends the subscriber data to the mobility management node 300 in response to a request from the mobility management node 300.

The mobility management node 300 is a control-plane node, and performs mobility management including control of paging of the wireless terminal 100. For example, in the case of the UMTS, the mobility management node 300 includes the control-plane function of an SGSN. Further, in the case of the EPS, the mobility management node 300 includes an MME (Mobility Management Entity).

Figure 2:
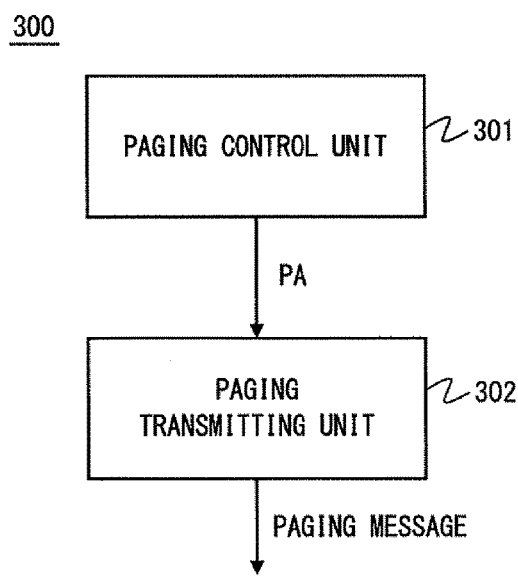
FIG. 2 is a diagram showing an illustrative configuration of mobility management nodes according to the first to fourth embodiments.

FIG. 2 shows an exemplary structure of the mobility management node 300 according to several embodiments including the first embodiment. In the example shown in FIG. 2, the mobility management node 300 includes a paging control unit 301 and a paging transmitting unit 302. The paging control unit 301 determines a PA of the wireless terminal 100. When downlink data to be transmitted to the wireless terminal 100 in the standby state arrives at the upper network 30, the paging transmitting unit 302 pages the wireless terminal 100 in the determined PA. Specifically, the paging transmitting unit 302 may send a paging message to at least one base station 200 within the determined PA. The base station 200 that received the paging message transmits a paging message addressed to the wireless terminal 100 on a downlink channel (e.g., a paging channel). The paging message transmitted from the base station is received by the wireless terminal 100 that is performing discontinuous reception. Note that, in the UMTS, an RNC transmits a paging message through the base station 200. Accordingly, the paging transmitting unit 302 may transmit a paging message to an RNC. Further, in the case where the mobility management node 300 fails to page the wireless terminal 100, the mobility management node 300 may repeatedly perform paging while changing the paging area.

There are various manners of determining a PA by the mobility management node 300 (the paging control unit 301). For example, in one embodiment, the PA may be identical to the location registration area to which the wireless terminal 100 belongs, or may be at least one location registration area selected from a plurality of location registration areas (e.g., a TA list) to which the wireless terminal 100 belongs. In other words, a determination of the PA by the mobility management node 300 may be performed by determining the location registration area to be assigned to the wireless terminal 100. Alternatively, in one embodiment, the PA may be determined based on the latest location of the wireless terminal 100. The mobility management node 300 can know the latest location of the wireless terminal 100 on cell (or sector) level or base station (200) level, by detecting a cell or a base station 200 which received from the wireless terminal 100 an attach request message or a location update message (e.g., a TAU request, an RAU (Routing Area Update) request). Further, in some implementations, the mobility management node 300 can use the location information of the wireless terminal 100 by means of the GPS. In such cases, the mobility management node 300 may determine the paging area based on the latest location of the wireless terminal 100 (e.g., any base station 200, any cell 210, the location by means of the GPS). Specifically, the paging control unit 301 may determine, as the paging area, the cell where the wireless terminal 100 was located last, or such cell and a cell adjacent thereto. Alternatively, the determination of the paging area may be made by selecting at least one base station or cell from base stations or cells included in the location registration area assigned to the wireless terminal 100.

Hereinafter, paging of the wireless terminal 100 according to the first embodiment will be described. In the present embodiment, the mobility management node 300 performs following processing for paging of the wireless terminal 100. That is, the mobility management node 300 determines the paging area (PA) of the wireless terminal 100 based on the external network 9 with which the wireless terminal 100 communicates through the base station 200 and the upper network 30 (i.e., the radio access network and the core network). Then, when downlink data to be transmitted to the wireless terminal 100 in the standby state arrives at the upper network 30, the mobility management node 300 pages the wireless terminal 100 in the determined PA.

The mobility management node 300, for example, may receive, from the wireless terminal 100 or the subscriber server 320, identification information (e.g., APN (Access Point Name) in the EPS and the UMTS) of the external network 9 with which the wireless terminal 100 communicates, when the wireless terminal 100 attaches to the upper network 30 or when its location is updated. Then, the mobility management node 300 may determine the PA of the wireless terminal 100 based on the received identification information of the external network 9.

The mobility management node 300 may determine a paging area (PA) determining algorithm in accordance with the external network 9 with which the wireless terminal 100 communicates, and determine the paging area of the wireless terminal 100 using the determined algorithm. The mobility management node 300 may specify the algorithm to be used in determining the PA of the wireless terminal 100 from a plurality of PA determining algorithms, in accordance with the external network 9. In other words, the PA determining algorithm is changed based on the external network 9 with which the wireless terminal 100 communicates, and thereby the paging area corresponding to the external network 9 is determined.

To determine the PA in accordance with the external network 9 is particularly effective when the external network 9 has a relationship with the mobility of the wireless terminal 100. The external network 9 with which the wireless terminal 100 communicates is determined according to a contract with the mobile operator or according to services utilized by the wireless terminal 100. Accordingly, in some implementations, the wireless terminal 100 that is used for a particular MTC service may communicate with the external network 9 dedicated to that MTC service. In this case, the mobility management node 300 can determine the mobility level of the wireless terminal 100 in accordance with the external network 9 with which the wireless terminal 100 communicates, and determine a proper PA corresponding to the mobility level.

For example, when the identification information (e.g., APN) of the external network 9 indicates a network for low mobility, the mobility management node 300 may determine for the wireless terminal 100 the PA that covers a smaller geographical region than those under other situations. The network for low mobility is, for example, a network for MTC services utilized by the wireless terminal 100 in low-mobility state (e.g., a smart meter, a vending machine). Further, when the identification information (e.g., APN) of the external network 9 indicates a network for high mobility, the mobility management node 300 may determine for the wireless terminal 100 the PA that covers a larger geographical region than those under other situations. The network for high mobility is, for example, an external network for the MTC services utilized by the wireless terminal 100 in high-mobility state (e.g., automobile communication).

Figure 3:
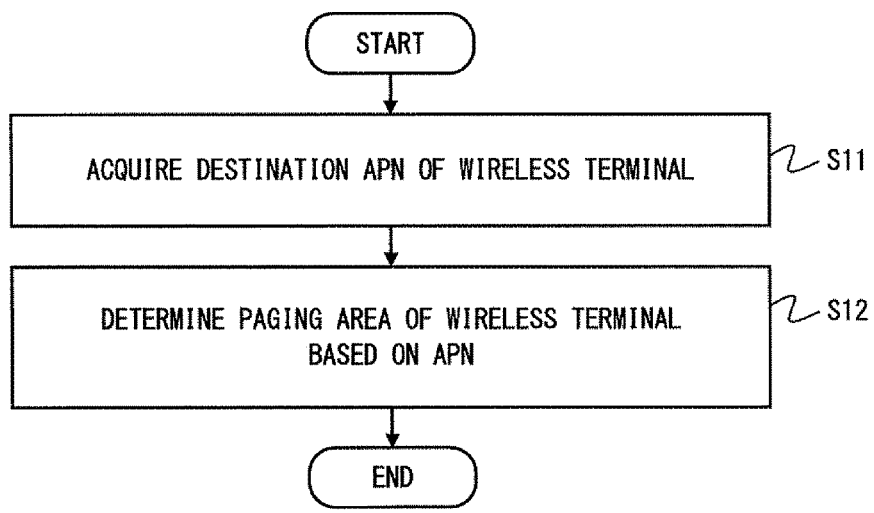
FIG. 3 is a flowchart showing an example of a paging control procedure according to the first embodiment.

FIG. 3 is a flowchart showing one example of a paging control procedure according to the present embodiment. In Step S11, the paging control unit 301 acquires the identification information (e.g., APN) of the external network 9 with which the wireless terminal 100 communicates. In Step S12, the paging control unit 301 determines the PA of the wireless terminal 100 based on the identification information of the external network 9.

Figure 4:
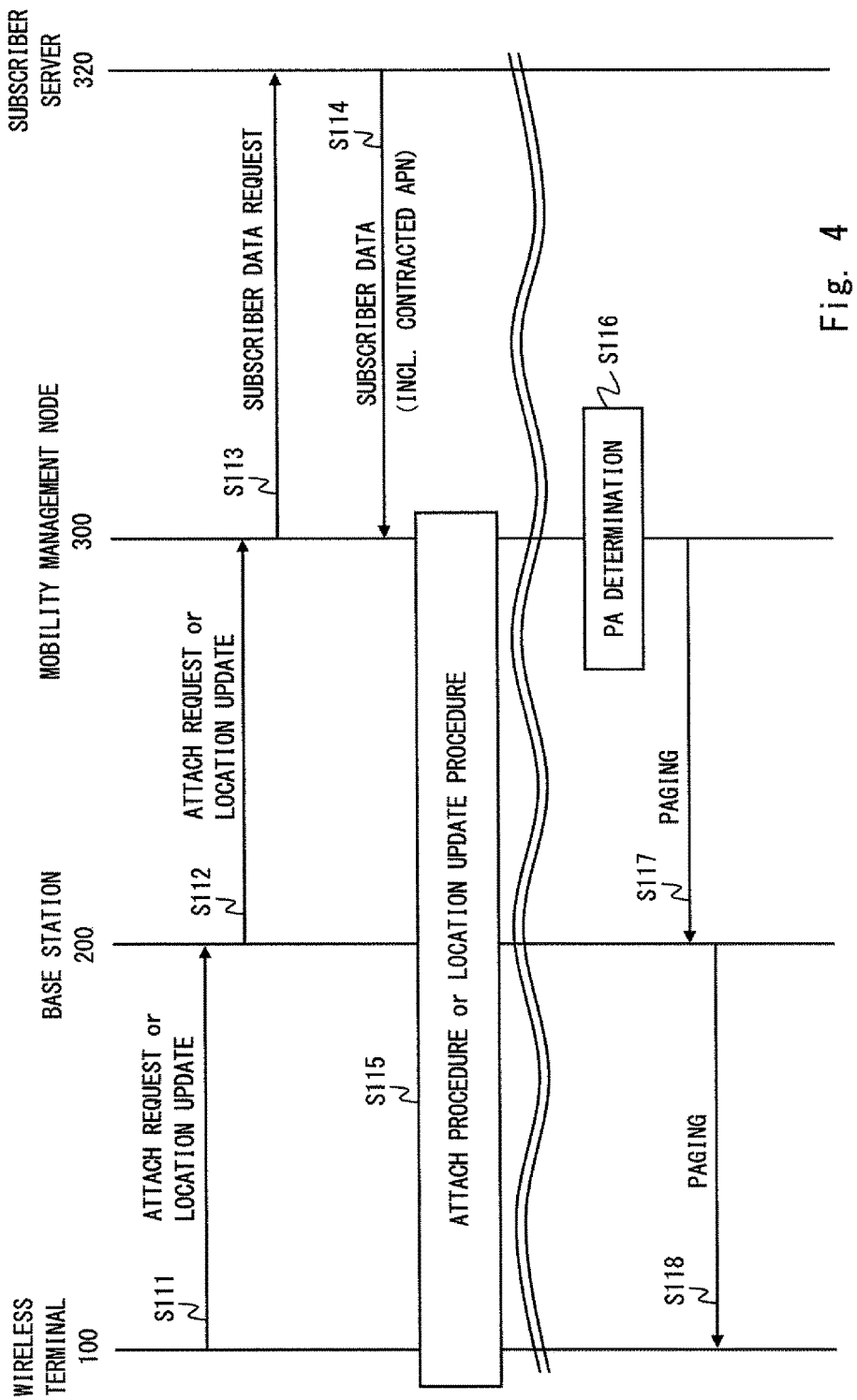
FIG. 4 is a sequence diagram showing an example of a paging procedure according to the first embodiment.

FIG. 4 is a sequence diagram showing one example of the paging procedure according to the present embodiment. FIG. 4 shows an example in which the mobility management node 300 acquires the identification information of the external network 9 in response to receipt of an attach request or a location update from the wireless terminal 100. In Step S111, the wireless terminal 100 sends an attach request message or a location update message. In Step S112, the base station 200 transfers the attach request message or the location update message from the wireless terminal 100 to the mobility management node 300. The attach request message is transmitted in order to request initial registration to the upper network 30. The attach request message and the location update message are the NAS (Non-Access Stratum) messages, and transferred to the upper network 30 (specifically the core network) without being terminated at the base station 200. The attach request message or the location update message includes an MSID (e.g., GUTI (Globally Unique Temporary ID), or IMSI (the International Mobile Subscriber Identity)) for identifying the wireless terminal 100. The IMSI is managed by the subscriber server 320 in the EPS and used in order to identify the subscriber. On the other hand, the GUTI is a temporary identifier that an MME as the mobility management node 300 assigns to the wireless terminal 100. The MME as the mobility management node 300 can acquire the IMSI of the wireless terminal 100, by querying the old MME, to which the wireless terminal 100 has connected in the past, as necessary based on the GUTI received from the wireless terminal 100.

In Step S113, in response to receipt of the attach request message or the location update message, the mobility management node 300 requests the subscriber server 320 to send the subscriber data of the wireless terminal 100. The request transmitted in Step S113 includes the MSID (which is the ID managed by the subscriber server 320, e.g., IMSI) of the wireless terminal 100. In Step S114, the mobility management node 300 receives the subscriber data of the wireless terminal 100 from the subscriber server 320. This subscriber data includes the identification information (e.g., the subscribed APN) of the external network 9 with which the wireless terminal 100 communicates. That is, in the example shown in FIG. 4, the mobility management node 300 acquires the identification information of the external network 9 from the subscriber server 320 during the process of attaching the wireless terminal 100 or updating the location of the wireless terminal 100. In Step S115, the mobility management node 300 executes the attach procedure or the location update procedure of the wireless terminal 100.

In Step S116, the mobility management node 300 determines the PA of the wireless terminal 100 by using the identification information of the external network 9 received from the subscriber server 320 in Step S114. Note that, the timing at which Step S116 is executed is not particularly limited. For example, Step S116 may be executed in sequence during or following the attach procedure or the location update procedure of the wireless terminal 100. Alternatively, Step S116 may be executed at any timing after completion of the attach or the location update of the wireless terminal 100. Further alternatively, Step S116 may be executed upon paging of the wireless terminal 100 (arrival of downlink traffic).

In Step S117, in response to arrival at the upper network 30 of the downlink traffic addressed to the wireless terminal 100, the mobility management node 300 sends a paging message to the base station 200 included in the PA of the wireless terminal 100. In Step S118, using a radio channel (e.g., a paging channel), the base station 200 transmits a paging message into the cell 210.

Note that, for example in the case where the subscriber data is acquired in response to a location update message from the wireless terminal 100, the mobility management node 300 may acquire the subscriber data of the wireless terminal 100 from the old mobility management node instead of the subscriber server 320. In this case, the mobility management node 300 does not need to request the subscriber server 320 to transmit the subscriber data. Note that, the old mobility management node is a mobility management node that manages the location registration area where the wireless terminal 100 was located in the past, and retains the subscriber data received from the subscriber server 320 at the time of attach of the wireless terminal 100.

Figure 5:
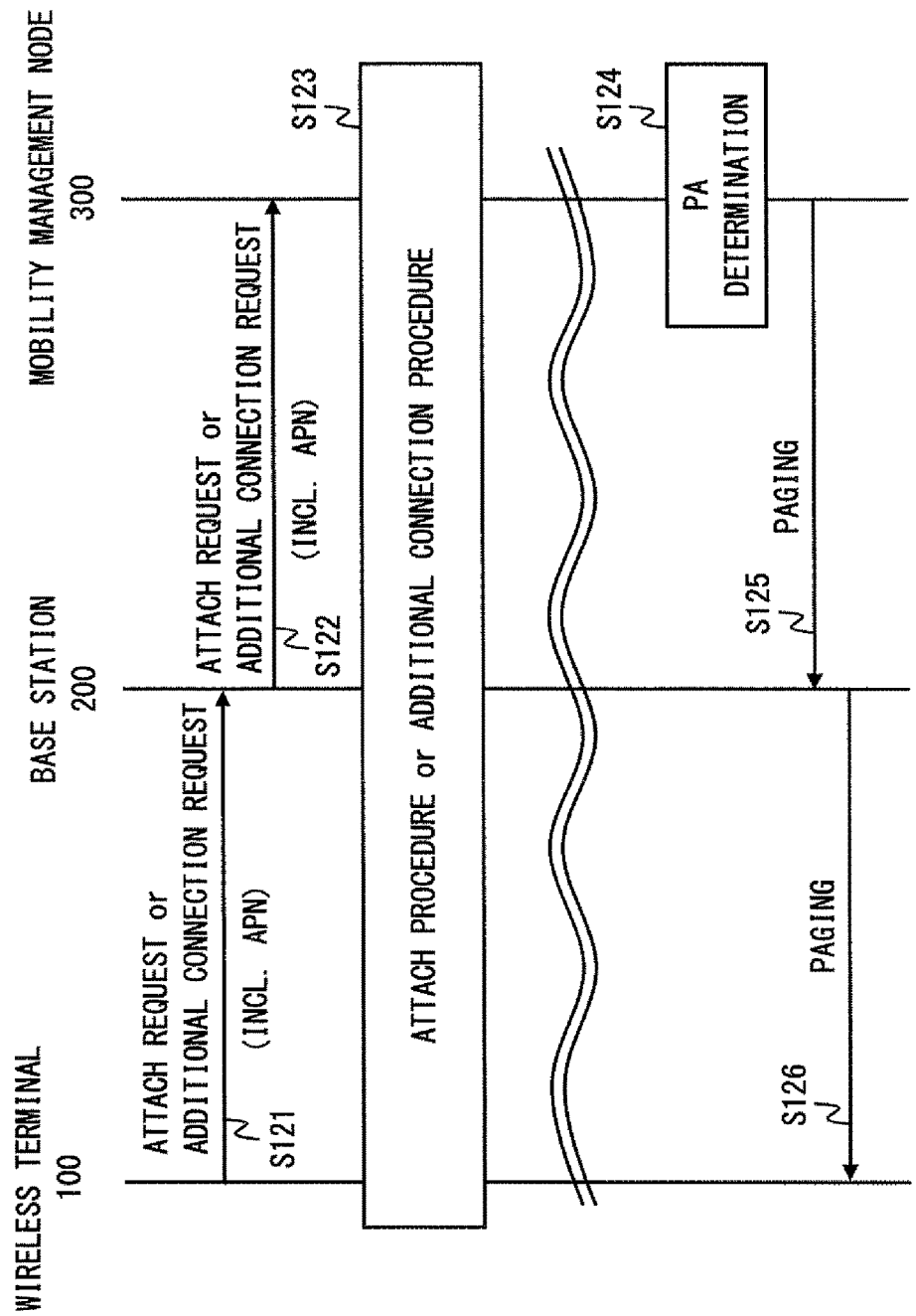
FIG. 5 is a sequence diagram showing an example of a paging procedure according to the first embodiment.

FIG. 5 is a sequence diagram showing another example of the paging procedure according to the present embodiment. In the example shown in FIG. 5, the mobility management node 300 receives the identification information of the external network 9 from the wireless terminal 100. That is, in Step S121, the wireless terminal 100 sends an attach request message or an additional connection request message. In Step S112, the base station 200 transfers the attach request message or the additional connection request message from the wireless terminal 100 to the mobility management node 300. In the example shown in FIG. 5, the attach request message and the additional connection request message include the identification information (e.g., APN) of the external network 9 with which the wireless terminal 100 requests communication. Note that, the additional connection request message is transmitted in order to request additional connection with new external network 9, in the case where the wireless terminal 100 has a function of simultaneously establishing connections (e.g., PDN (Packet Data Network) connections) with a plurality of external networks 9. In Step S123, the mobility management node 300 executes the attach procedure or the additional connection activation procedure of the wireless terminal 100.

In Step S124, the mobility management node 300 determines the PA of the wireless terminal 100 by using the identification information of the external network 9 received from the wireless terminal 10 in Step S122. In Step S125, in response to arrival of the downlink traffic addressed to the wireless terminal 100 at the upper network 30, the mobility management node 300 sends a paging message to the base station 200 included in the PA of the wireless terminal 100. In Step S126, using a radio channel, the base station 200 transmits a paging message into the cell 210.

As described above, the present embodiment determines the PA of the wireless terminal 100 by introducing a new index, namely the external network 9 with which the wireless terminal 100 communicates. Accordingly, the present embodiment can contribute toward determining a proper PA corresponding to the external network 9 with which the wireless terminal 100 communicates. Note that, as already described, the PA in the present embodiment may be identical to the location registration area to which the wireless terminal 100 belongs, or may be at least one location registration area selected from a plurality of location registration areas (e.g., a TA list) to which the wireless terminal 100 belongs. Taking into consideration of various use applications of the wireless terminal 100 including MTC, it is possible that the mobility characteristic of the wireless terminal 100 greatly varies depending on a use case of the mobile station 100. Further, in some cases, the external network 9 is associated with a specific service, and the mobility level of the wireless terminal 100 is characterized by the specific service. In such cases, by determining the PA in accordance with the external network 9, a proper PA that corresponds to the mobility level of the wireless terminal 100 can be obtained.

Further, to determine the PA based on the external network 9 brings about the following advantages as compared to the case where the identification information (e.g., IMEI (International Mobile Equipment Identity), IMEISV (International Mobile Equipment Identity Software Version) of the wireless terminal 100 is used. For example, there is the case where wireless terminals manufactured by the same manufacturer, wireless terminals of the same model, or wireless terminals of the same software version (revision) are used for a plurality of applications, and where they are different in the mobility level depending on the use applications. For example, there is a case where the same wireless terminals are implemented in a vending machine and an automobile. In this case, the mobility level of each wireless terminal 100 may not be determined just by referring to the identification information (e.g., the IMEI) of the wireless terminal 100. In contrast, according to the present embodiment, for example the identification information (APN) of the external network 9 is referred to, and the mobility level of the wireless terminal 100 can be determined based on the external network 9. Accordingly, even when the wireless terminals of the same manufacturer, the same model, or the same software version (revision) are used for a plurality of use applications, a proper PA corresponding to the particular use application of the wireless terminal 100 can be determined.

Second Embodiment

In the second embodiment, configurations of a mobile communication system and a mobility management node 300 may be the same as those of the examples shown in FIGS. 1 and 2. In the present embodiment, the mobility management node 300 (the paging control unit 301) is configured to acquire the subscriber data including low-mobility information of the wireless terminal 100 from the subscriber server 320, to determine the paging area of the wireless terminal 100 based on the low-mobility information. In other words, the mobility management node 300 operates to determine the paging area of the wireless terminal 100 based on the mobility information included in the subscriber data, instead of the mobility information received from the wireless terminal 100.

Figures 6, 7:
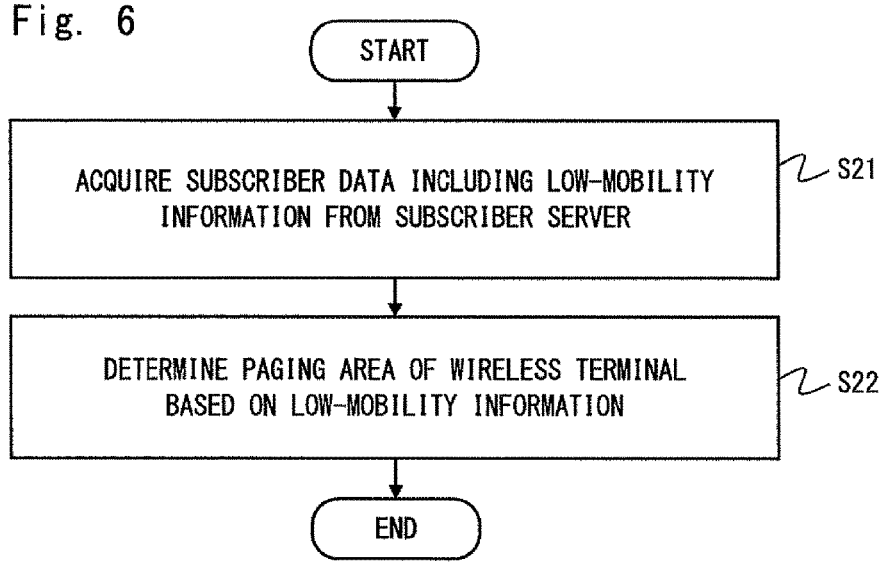
FIG. 6 is a flowchart showing an example of a paging control procedure according to the second embodiment.
FIG. 7 is a diagram showing an example of information retained by a subscriber server according to the second embodiment.

FIG. 6 is a flowchart showing one example of a paging control procedure according to the present embodiment. In Step S21, the paging control unit 301 acquires the subscriber data including the low-mobility information of the wireless terminal 100 from the subscriber server 320. In Step S22, the paging control unit 301 determines the PA of the wireless terminal 100 based on the low-mobility information relating to the wireless terminal 100.

The low-mobility information according to the present embodiment is only required to be the information with which the mobility level of the wireless terminal 100 can be determined. For example, the low-mobility information may be flag information that directly explicitly indicates whether or not the wireless terminal 100 is in low mobility. Further, the low-mobility information may be the identification information of the external network 9 (e.g., APN) described in the first embodiment. Further, the low-mobility information may be the type (model) information of the wireless terminal 100. The type information of the wireless terminal 100 may be given based on the difference in devices in which the wireless terminal 100 is mounted, such as a general mobile terminal (e.g., a mobile phone, a smartphone, and a tablet computer), an automobile, a railway vehicle, and a vending machine. The difference in the device in which the wireless terminal 100 is mounted implicitly shows the difference in mobility level.

FIG. 7 shows a specific example of the mobility type (i.e., the low-mobility information) retained by the subscriber server 320. As shown in FIG. 7, the subscriber server 320 may retain the mobility type in association with the wireless terminal identifier (MSID) for each of the wireless terminals 100. In some cases, the MSID is referred to as the subscriber identifier. The MSID may be the IMSI. In FIG. 7, as the mobility type, four types of Type A to Type D are shown. For example, Type A is an identifier associated with general users, i.e., general mobile terminals (e.g., a mobile phone, a smartphone, and a tablet computer). Type B is an identifier associated with MTC devices with high mobility level and great mobility randomness, for example automobiles. Type C is an identifier associated with MTC devices with high mobility level and on which great movement restriction is placed (i.e., with small movement randomness), for example a railway vehicle. Type D is an identifier associated with MTC devices with low mobility level, for example a vending machine, a smart meter and the like.

Figure 8:
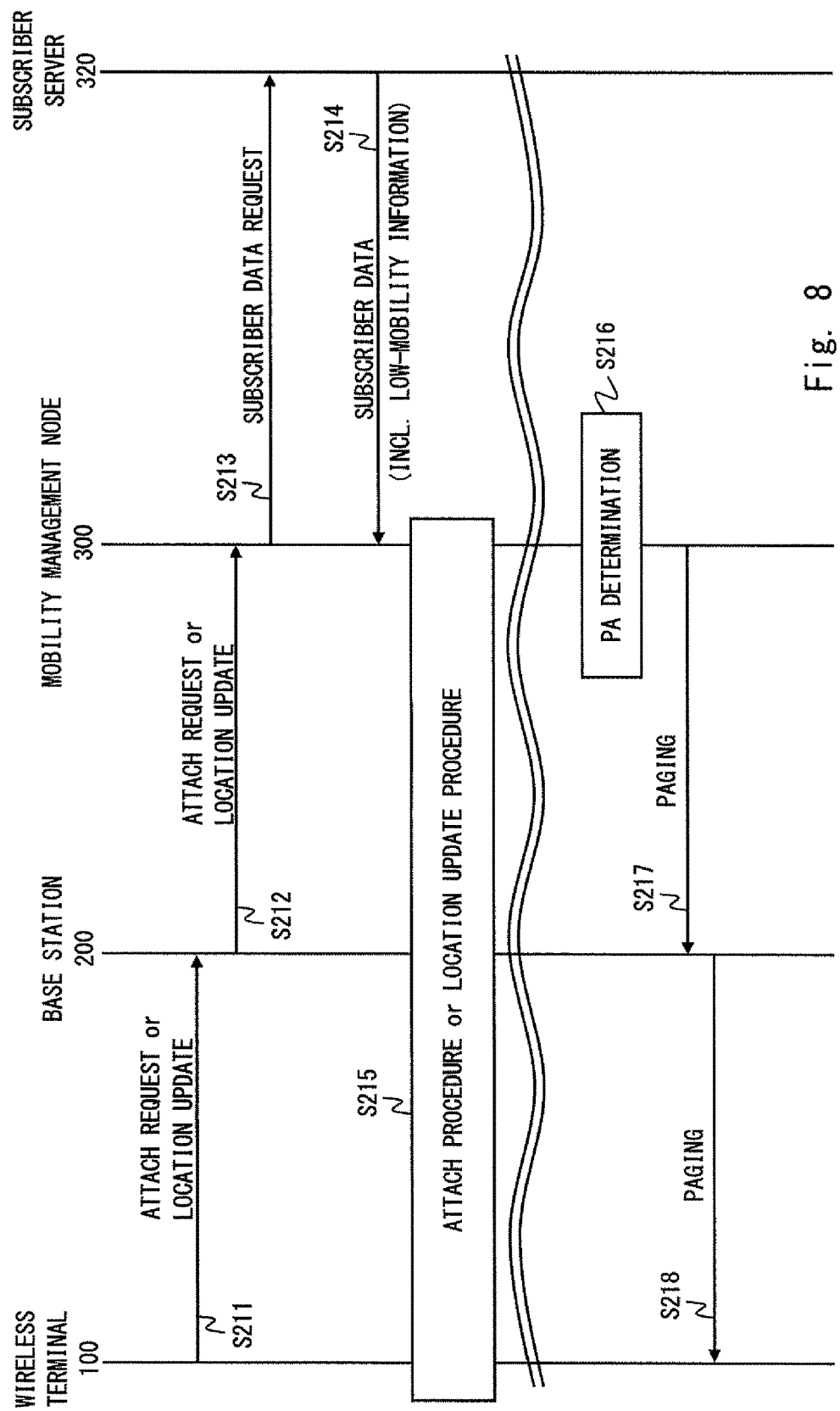
FIG. 8 is a sequence diagram showing an example of a paging procedure according to the second embodiment.

FIG. 8 is a sequence diagram showing one example of the paging procedure according to the present embodiment. The example of FIG. 8 shows, similarly to the example of FIG. 4, the procedure of the mobility management node 300 acquiring the subscriber data upon attach or location update of the wireless terminal 100. Accordingly, the procedure shown in FIG. 8 is similar to that shown in FIG. 4 except for Step S214 in which subscriber data sent from the subscriber server 320 to the mobility management node 300 includes low-mobility information. That is, Steps S211 to S213 in FIG. 8 respectively correspond to Steps S111 to S113 in FIG. 4, and Steps S215 to S218 in FIG. 8 respectively correspond to Steps S115 to S118 in FIG. 4.

As described above, in the present embodiment, the PA of the wireless terminal 100 is determined based on the low-mobility information included in the subscriber data. There is an advantage in the embodiment that a mechanism for determining a different PA for each wireless terminal 100 is introduced by coping (improvement) of the upper network 30, and thereby an impact given to the wireless terminal 100 is small. Further, as described in the first embodiment also, there is a case where wireless terminals of the same manufacturer, the same model, or the same software version (revision) are used for a plurality of use applications, and where they are different in mobility level depending on the use applications. In this case, in the present embodiment, by addressing the situation based on the setting of the subscriber data, a different PA for each wireless terminal 100 can be determined. Note that, as described above, the PA in the present embodiment may be identical to the location registration area to which the wireless terminal 100 belongs, or it may be at least one location registration area selected from a plurality of location registration areas (e.g., a TA list) to which the wireless terminal 100 belongs.

Third Embodiment

In the third embodiment, configurations of a mobile communication system and a mobility management node 300 may be the same as those of the examples shown in FIGS. 1 and 2. In the present embodiment, the mobility management node 300 (the paging control unit 301) is configured to determine, when it is determined that the wireless terminal 100 is in low mobility, a PA that covers a smaller geographical region than in the case where the wireless terminal 100 is not in low mobility. This PA for low mobility includes the cell (or sector) where the wireless terminal 100 was located last and the cell (or sector) adjacent thereto. The cell where the wireless terminal was located last may be the cell where the wireless terminal 100 sent an attach request message, or the cell where the wireless terminal 100 sent a location update message.

The determination of whether or not the wireless terminal 100 is in low mobility may be made in a manner similar to the first embodiment or the second embodiment. That is, the mobility management node 300 may determine whether or not the wireless terminal 100 is in low mobility based on the external network 9 with which the wireless terminal 100 communicates. Alternatively, the mobility management node 300 may determine whether or not the wireless terminal 100 is in low mobility based on the low-mobility information included in the subscriber data received from the subscriber server 320. Further alternatively, the mobility management node 300 may determine whether or not the wireless terminal 100 is in low mobility based on a notification from other network node (e.g., the subscriber server 320) that has determined that the wireless terminal 100 is in low mobility.

Furthermore, alternatively, the mobility management node 300 may determine whether or not the wireless terminal 100 is in low mobility based on the low-mobility information transmitted from the wireless terminal 100. The low-mobility information transmitted from the wireless terminal 100 is, for example, the identification information of the wireless terminal 100 (e.g., IMEI, IMEISV). The IMEISV includes a two-digit SVN (Software Version Number) indicative of the revision of software installed in the wireless terminal 100. The SVN may be used for identifying the low-mobility terminal.

In the present embodiment, the mobility management node 300 needs to know a cell (or sector) adjacent to the cell (or sector) where the wireless terminal 100 is located. The adjacency relationship of the cells may be preset by the operator. Alternatively, the mobility management node 300 may communicate with the base stations 200 to receive adjacent cell information detected by the base stations 200. Further alternatively, the mobility management node 300 may acquire the location information of each base station 200 to determine the cell adjacency relationship based on the location information of base stations 200. Furthermore, alternatively, the mobility management node 300 may receive the cell adjacency relationship from the network management system. In some cases, the network management system is referred to as an OAM (Operation Administration and Maintenance) server, an OMC (Operation and Maintenance Centre), a NM (Network Manager), or an EM (Element Manager).

Figure 9:
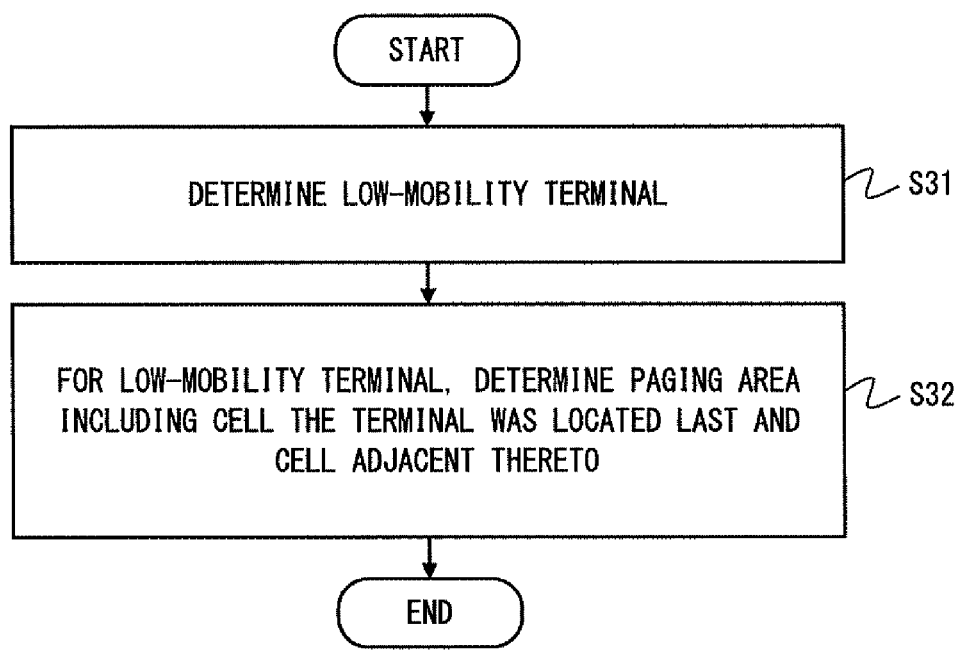
FIG. 9 is a flowchart showing an example of a paging control procedure according to the third embodiment.

FIG. 9 is a flowchart showing an example of the paging control procedure according to the present embodiment. In Step S31, the paging control unit 301 determines whether or not the wireless terminal 100 is a low-mobility terminal. In Step S32, the paging control unit 301 determines, for the wireless terminal 100 determined as being in a low-mobility terminal, the PA that includes the cell where the wireless terminal 100 was located last and the cell adjacent thereto.

Figure 10:
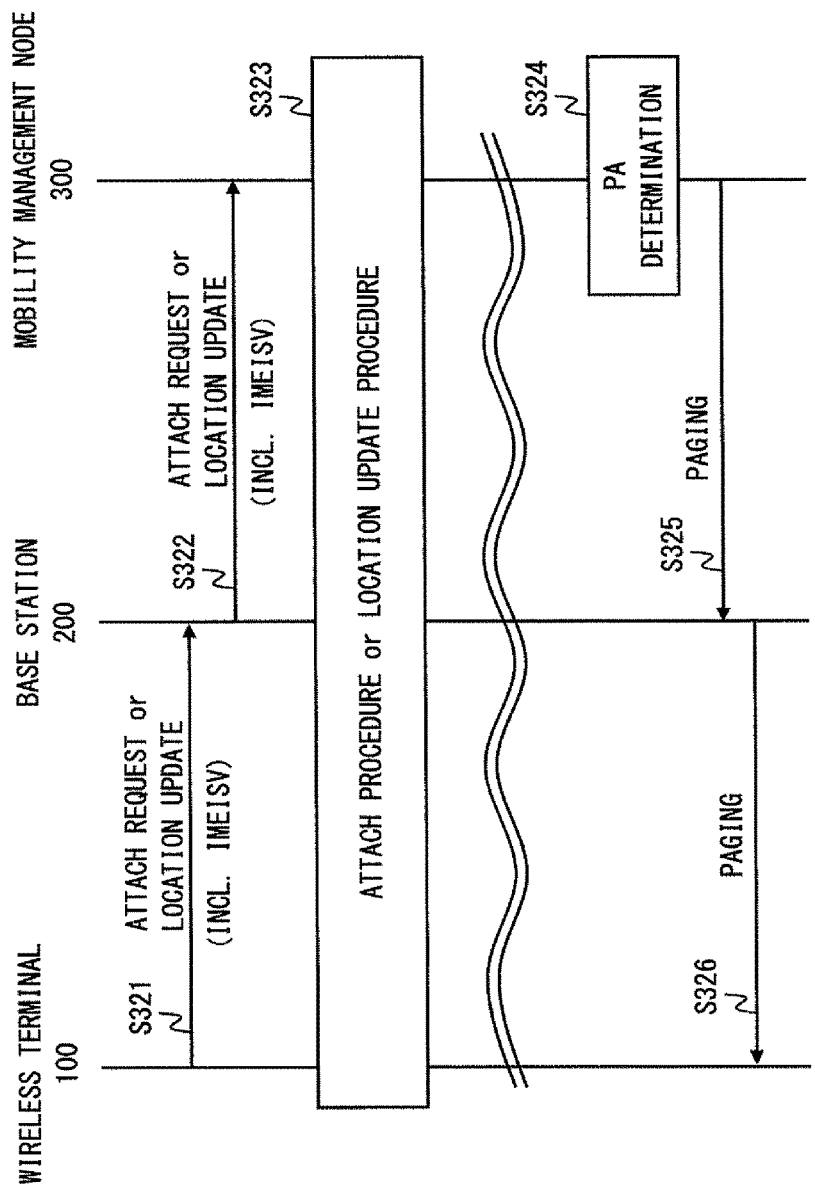
FIG. 10 is a sequence diagram showing an example of a paging procedure according to the third embodiment.

FIG. 10 is a sequence diagram showing one example of the paging procedure according to the present embodiment. In the example shown in FIG. 10, the mobility management node 300 determines whether or not the wireless terminal 100 is in low mobility, using the identification information of the wireless terminal 100 (e.g., IMEI, IMEISV) received from the wireless terminal 100. In Step S321, the wireless terminal 100 sends an attach request message or a location update message. In Step S322, the base station 200 transfers the attach request message or the location update message from the wireless terminal 100 to the mobility management node 300. The attach request message or the location update message shown in FIG. 10 includes the identification information of the wireless terminal 100 (e.g., IMEI, IMEISV). In Step S323, the mobility management node 300 executes the attach procedure or the location update procedure of the wireless terminal 100. In Step S324, the mobility management node 300 determines the PA of the wireless terminal 100, using the identification information of the wireless terminal 100 received from the wireless terminal 10 in Step S322. When the wireless terminal 100 is in low mobility, the determined PA includes the cell (or sector) where the wireless terminal 100 was located last and the cell (or sector) adjacent thereto. In Steps S325 and S326, a paging message is transmitted from the mobility management node 300 to the wireless terminal 100.

To determine solely the cell (or sector) where the wireless terminal 100 was located last as the PA in the case where the wireless terminal 100 is in low mobility may invite paging failure, for example when the wireless terminal 100 is located near the boundary of the cell. In the present embodiment, since not only the cell where the low-mobility terminal was located last but also the cell adjacent thereto are included in the PA, a paging failure can be suppressed. Typically, the mobility management node 300 may determine, as the PA of a low-mobility terminal, only the cell where the low-mobility terminal was located last and the cell adjacent thereto. Thus, an increase in the paging load can also be suppressed. Note that, the PA according to the present embodiment may be identical to the location registration area to which the wireless terminal 100 belongs, or may be at least one location registration area selected from a plurality of location registration areas (e.g., a TA list) to which the wireless terminal 100 belongs.

Further, in one specific example of the present embodiment, the SVN (Software Version Number) within the IMEISV is used as the low-mobility information transmitted from the wireless terminal 100. While the IMEI is the fixed code to the hardware of the wireless terminal 100, the SVN can be configurable. Accordingly, a mobile operator or a manufacturer of the wireless terminal 100 can set the SVN after shipping the wireless terminal 100, for example. For this reason, by using the SVN, a particular terminal group (e.g., low-priority terminals) can be easily designated, and a PA unique to the specific terminal group can be easily determined.

Fourth Embodiment

In the fourth embodiment, configurations of a mobile communication system and a mobility management node 300 may be the same as those of the examples shown in FIGS. 1 and 2. In the present embodiment, the mobility management node 300 (the paging control unit 301) is configured to newly set, in response to reception of an attach request message or a location update message from the wireless terminal 100 of low mobility, a location registration area for low mobility that includes the cell (or sector) through which the attach request message or the location update message was transmitted. Further, the mobility management node 300 (the paging control unit 301) is configured to notify the wireless terminal 100 of the newly set location registration area for low mobility. Further, the mobility management node 300 (the paging transmitting unit 302) is configured to transmit, to the location registration area for low mobility, a paging message addressed to the wireless terminal 100.

The mobility management node 300 may newly set the location registration area for low mobility when the wireless terminal 100 is determined as being in low mobility. It is preferable that the location registration area for low mobility is determined to cover a smaller geographical region than a pre-configured location registration area that is assigned to a normal wireless terminal which is not in low mobility. Thus, in the case where paging is performed using a location registration area as a paging area, the paging load of the low-mobility terminal can be reduced. For example, the location registration area for low mobility may include only the cell (or sector) where the wireless terminal 100 was located last. Alternatively, the location registration area for low mobility may include only the cell (or sector) where the wireless terminal 100 was located last and the cell adjacent thereto.

On the other hand, the mobility management node 300 may notify the wireless terminal 100 of a previously statically configured location registration area when the wireless terminal 100 is determined as being not in low mobility (e.g., in the case where the wireless terminal 100 is a mobile phone terminal, a smartphone and the like). The location registration area pre-configured for a normal wireless terminal covers a larger geographical region than the location registration area for low mobility. Note that, the determination of whether or not the wireless terminal 100 is in low mobility according to the present embodiment may be made similarly to any one of the first to third embodiments.

Figure 11:
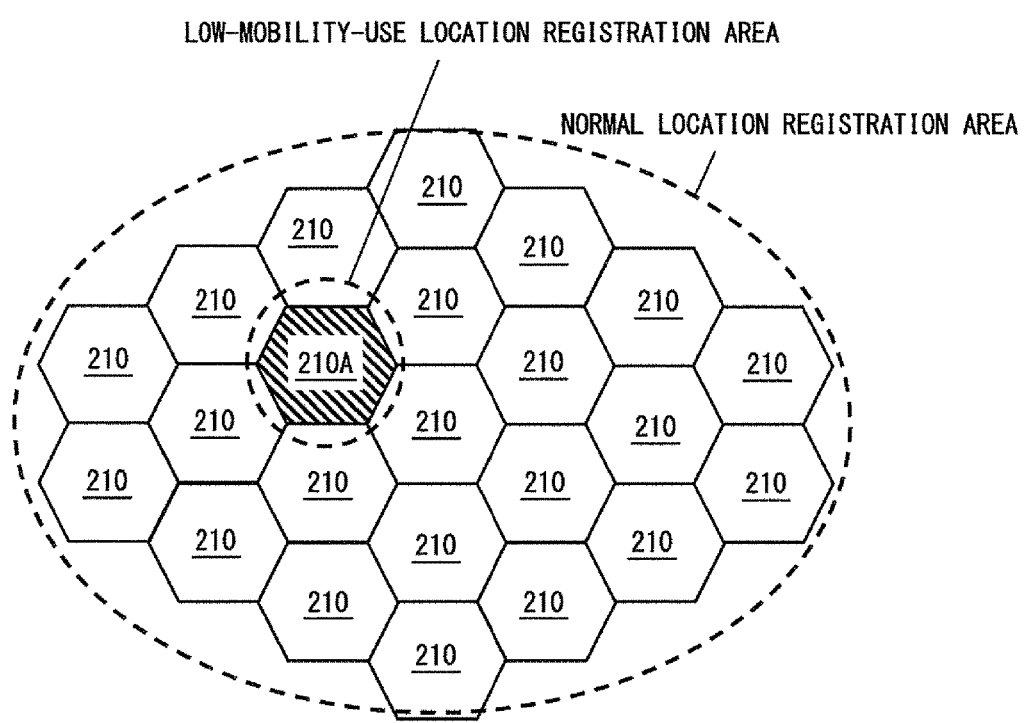
FIG. 11 is a diagram showing an example of a location registration area for low mobility according to the fourth embodiment.

FIG. 11 is a diagram showing one example of the location registration area for low mobility according to the present embodiment. In the example shown in FIG. 11, the location registration area for low mobility includes only the cell where the wireless terminal 100 was located last, i.e., the cell where the wireless terminal 100 transmitted an attach request message or a location update message last. The normal location registration area assigned to a normal wireless terminal (a terminal being not in low mobility) covers a larger geographical region than the location registration area for low mobility.

Figure 12:
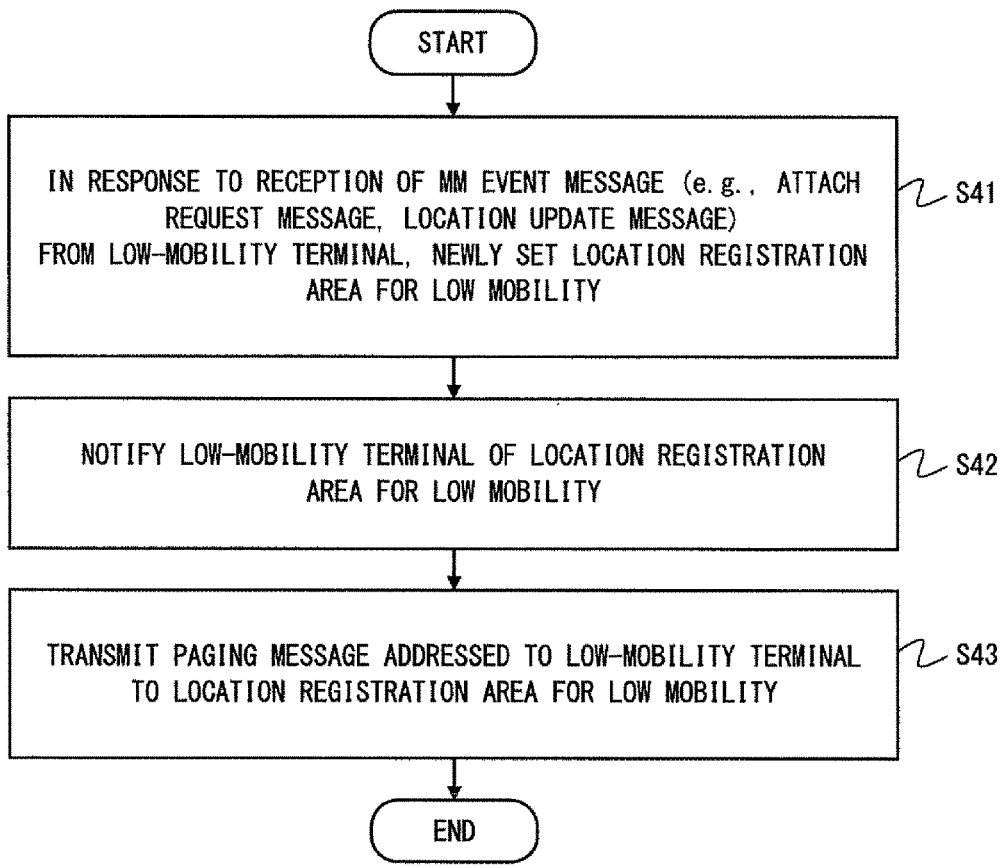
FIG. 12 is a flowchart showing an example of a paging control procedure according to the fourth embodiment.

FIG. 12 is a flowchart showing one example of a paging control procedure according to the present embodiment. In Step S41, in response to reception of a mobility management event message (e.g., an attach request message, a location update message) from a low-mobility terminal, the mobility management node 300 newly sets a location registration area for low mobility. In Step S42, the mobility management node 300 notifies the wireless terminal 100, which is the sender of the mobility management event message, of the newly set location registration area for low mobility. This notification may be included in the response message to the mobility management event message. In Step S43, a paging message addressed to the wireless terminal 100 being the low-mobility terminal is transmitted to the location registration area for low mobility.

Figure 13:
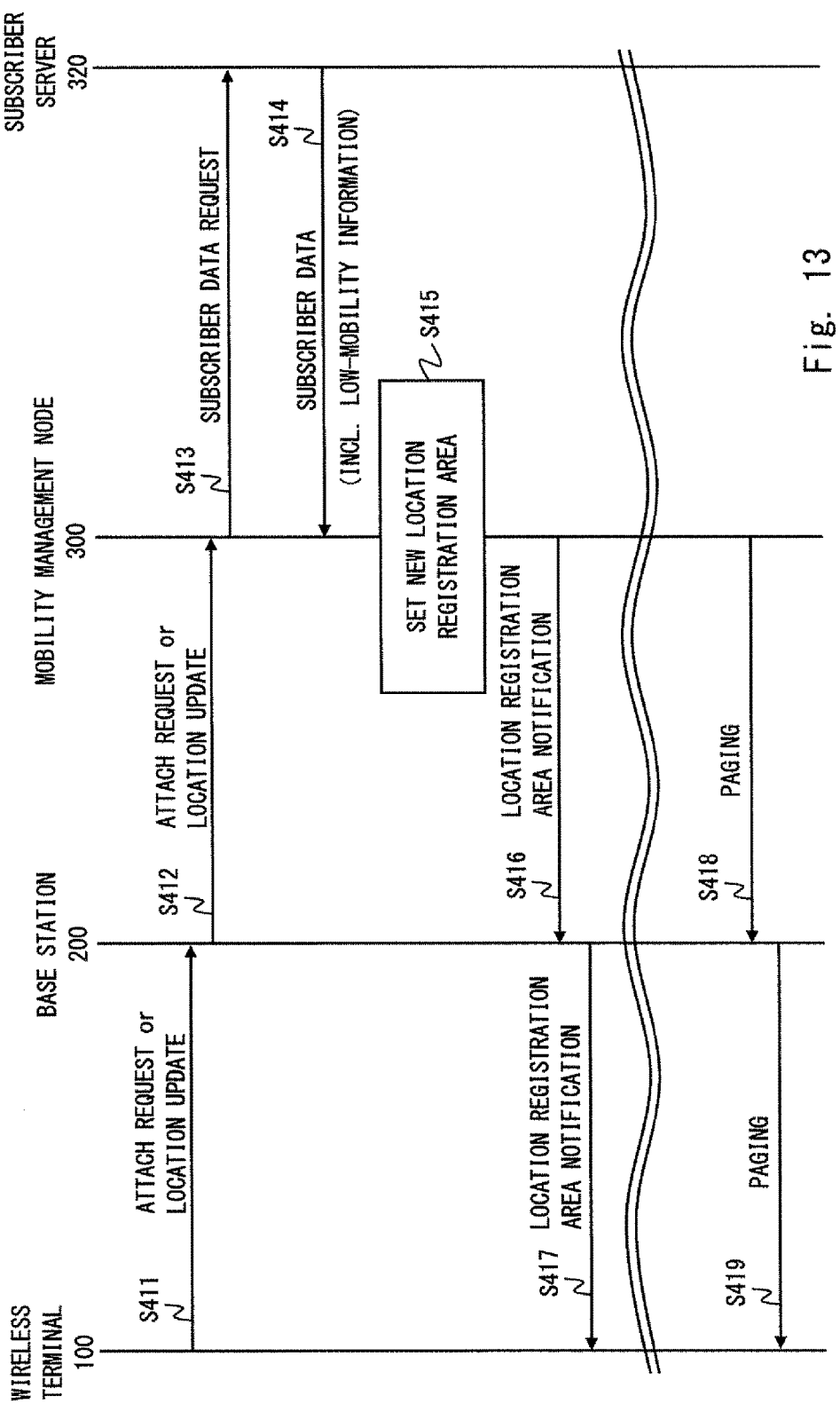
FIG. 13 is a sequence diagram showing an example of a paging procedure according to the fourth embodiment.

FIG. 13 is a sequence diagram showing one example of the paging procedure according to the present embodiment. FIG. 13 shows a modification of the example shown in FIG. 8. The processes in Steps S411 to S414 in FIG. 13 may be similar to those in Steps S211 to S214 in FIG. 8. In Step S415, the mobility management node 300 determines that the wireless terminal 100 is in low mobility, and sets a new location registration area for low mobility for the wireless terminal 100. In Steps S416 and S417, the mobility management node 300 sends to the wireless terminal 100 a location registration area notification indicative of the location registration area for low mobility. This notification may be sent using an NAS message, and the notification may be a response message indicative of completion of the attach request or the location update. In Step S418, in response to arrival of downlink traffic addressed to the wireless terminal 100 at the upper network 30, the mobility management node 300 sends a paging message to the base station 200 included in the location registration area for low mobility assigned to the wireless terminal 100. In Step S419, the base station 200 transmits a paging message into the cell 210 using a radio channel (e.g., a paging channel).

Figure 14:
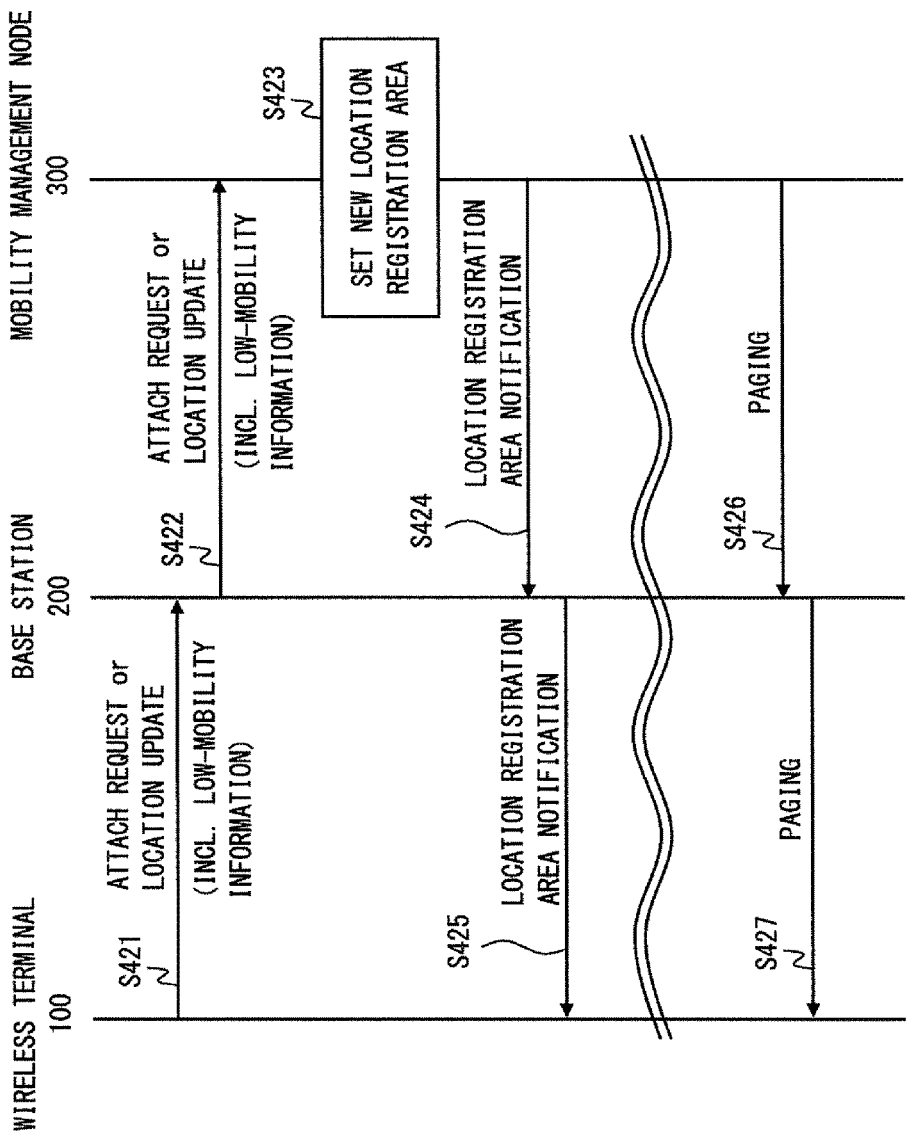
FIG. 14 is a sequence diagram showing an example of a paging procedure according to the fourth embodiment.

FIG. 14 is a sequence diagram showing another example of the paging procedure according to the present embodiment. In the example shown in FIG. 14, the mobility management node 300 determines whether or not the wireless terminal 100 is in low mobility, using low-mobility information transmitted from the wireless terminal 100. The low-mobility information transmitted from the wireless terminal 100 is, for example, the identification information of the wireless terminal 100 (e.g., IMEI, IMEISV). In Steps S421 and S424, an attach request message or a location update message is sent from the wireless terminal 100 to the mobility management node 300. In Step S423, the mobility management node 300 determines that the wireless terminal 100 is in low mobility based on the low-mobility information received from the wireless terminal 100, and sets a new location registration area for low mobility for the wireless terminal 100. The processes in Steps S424 to S427 may be the same as those in Steps S416 to S419 in FIG. 13.

As has been described above, in the present embodiment, in response to connection establishment of a low-mobility terminal, a location registration area for low mobility that includes the cell where the low-mobility terminal is located is newly set. Then, in the present embodiment, paging is performed using the location registration area as a paging area. To dynamically determine a paging area being different from the location registration area for each paging may disadvantageously increase the processing load (paging load) of the mobility management node 300 that performs paging control. The present embodiment copes with the problem, by employing the architecture in which paging is performed on a location registration area-by-location registration area basis, and assigning a newly set smaller location registration area to a low-mobility terminal. Thus, according to the present embodiment, an increase in the paging load can be suppressed.

Fifth Embodiment

In the fifth embodiment, configurations of a mobile communication system and a mobility management node 300 may be the same as those of the examples shown in FIGS. 1 and 2. In the fourth embodiment described above, a location registration area is additionally set dynamically by the mobility management node 300. The base station 200 may need to broadcast the updated system information accordingly. Note that, the system information includes an identifier of a location registration area to which a cell belongs (e.g., TAI (Tracking Area Identity), or RAI (Routing Area Identity)). By receiving the system information broadcasted from the base stations 200, the wireless terminal 100 detects movement out of the location registration area assigned to the wireless terminal 100 itself, and then sends a location update message to the mobility management node 300. Accordingly, when a location registration area is dynamically added (or deleted), the base station 200 should broadcast updated system information, by adding (or deleting) the identifier of the added (or deleted) location registration area. In the present embodiment, a description will be given of a procedure of updating system information that is broadcasted in a cell by the base station 200 when a location registration area is dynamically added or deleted.

Figure 15:
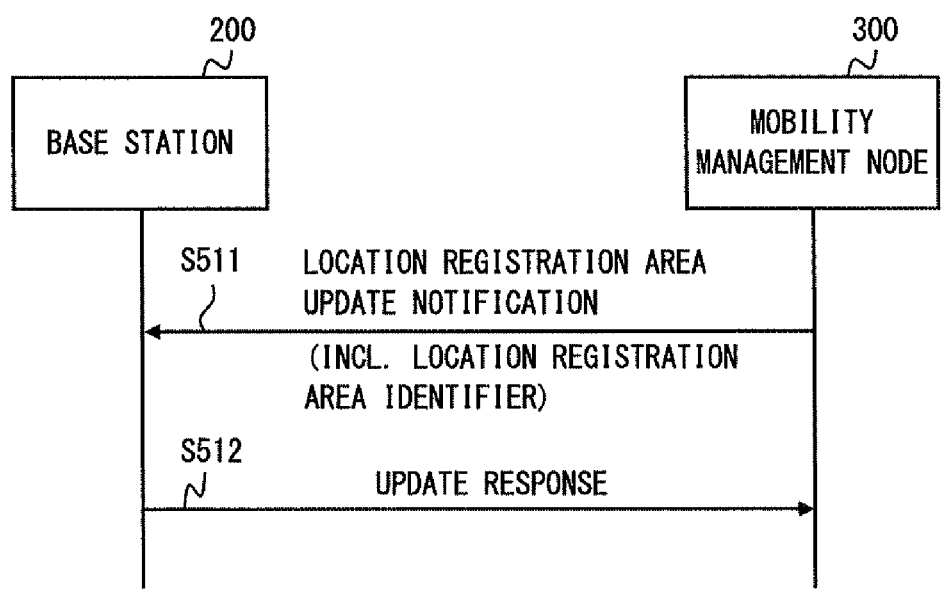
FIG. 15 is a sequence diagram showing an example of a procedure for controlling a location registration area according to a fifth embodiment.

FIG. 15 is a sequence diagram showing one example of a location registration area control procedure according to the present embodiment. In Step S511, the mobility management node 300 sends a location registration area update notification to the base station 200. The update notification includes the identifier of the added or deleted location registration area (e.g., TAI, RAI). Further, the update notification is selectively transmitted to the base station 200 managing a cell included in the added or deleted location registration area. In Step S512, the base station 200 sends an update response in response to the location registration area update notification. The base station 200 may send the update response in Step S512, in response to completion of updating the location registration area information included in the system information according to the location registration area update notification.

Figure 16:
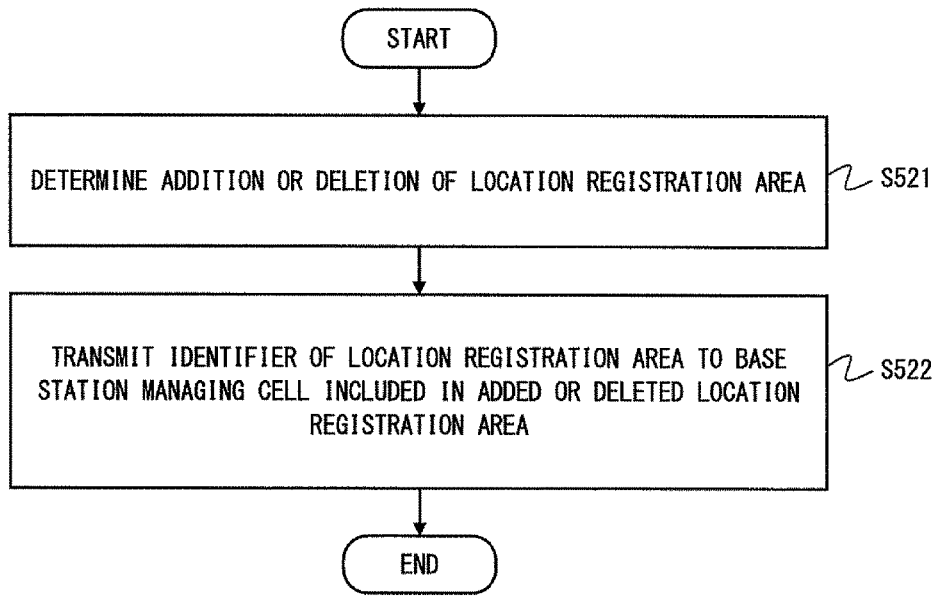
FIG. 16 is a flowchart showing an example of a procedure, performed by a mobility management node, for controlling a location registration area according to the fifth embodiment.

FIG. 16 is a flowchart showing one example of a location registration area control procedure performed by the mobility management node 300 according to the present embodiment. In Step S521, the mobility management node 300 determines dynamic addition or deletion of a location registration area. Dynamic addition of a location registration area is carried out, for example, by additionally setting a location registration area for low mobility in response to connection establishment of a low-mobility terminal, as described in the fourth embodiment. Further, dynamic deletion of a location registration area may be carried out by deleting a location registration area for low mobility in response to absence of a low-mobility terminal in a cell, for example, to absence of reception of NAS requests (e.g., an attach request, a location registration request, a service request) from a low-mobility terminal for a prescribed period. Addition or deletion of a location registration area may be carried out based on other factors. In Step S522, the mobility management node 300 sends the identifier of the added or deleted location registration area to the base station 200 that manages the cell included in the added or deleted location registration area.

Figure 17:
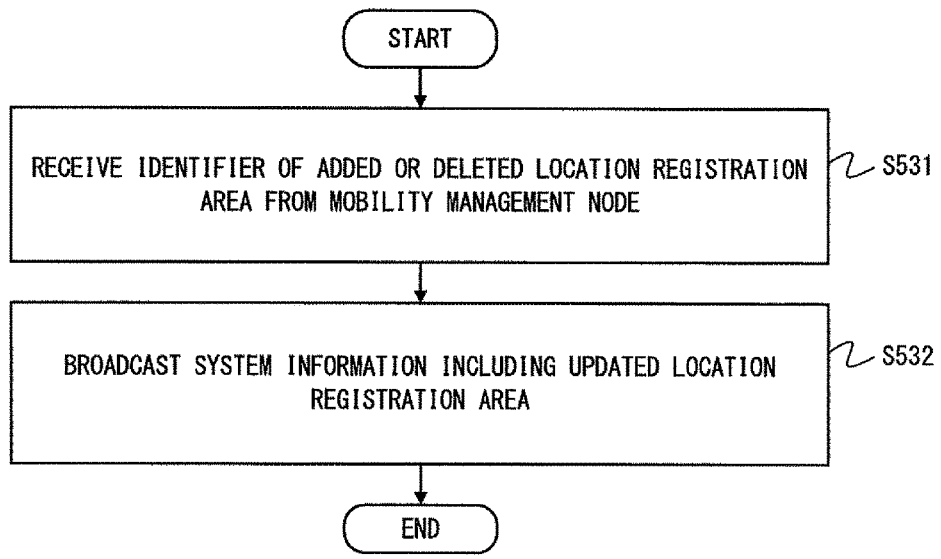
FIG. 17 is a flowchart showing an example of a procedure, performed by a base station, for controlling a location registration area according to the fifth embodiment.

FIG. 17 is a flowchart showing one example of a location registration area control procedure performed by the base station 200 according to the present embodiment. In Step S531, the base station 200 receives the identifier of the added or deleted location registration area from the mobility management node 300. In Step S532, the base station 200 updates the location registration area information by adding or deleting the location registration area identifier in accordance with the notification from the mobility management node 300, and broadcasts the system information including the updated location registration area information in its cell. The system information is transmitted using, for example, a BCH (Broadcast Channel).

Figure 18:
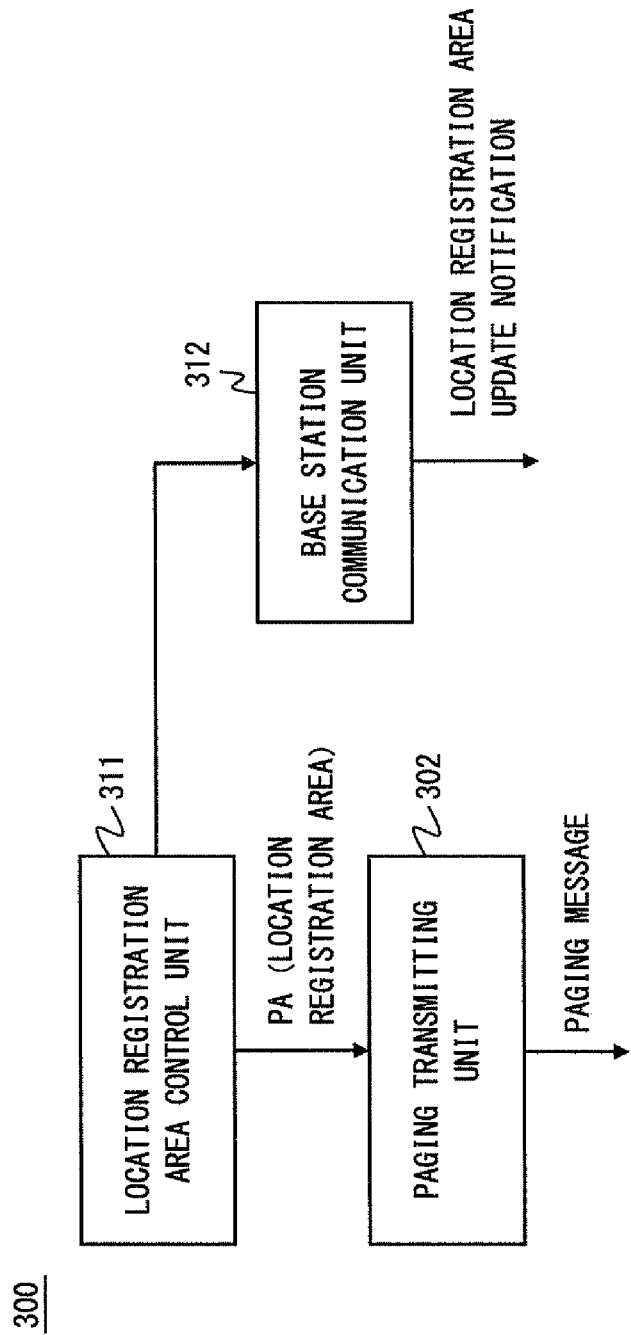
FIG. 18 is a diagram showing an illustrative configuration of a mobility management node according to the fifth embodiment.

FIG. 18 is a block diagram showing an illustrative configuration of the mobility management node 300 according to the present embodiment. A location registration area control unit 311 determines addition or deletion of a location registration area. As described in the fourth embodiment, in the case where a location registration area for low mobility is additionally set in response to connection establishment of a low-mobility terminal, the location registration area control unit 311 corresponds to the paging control unit 301. A base station communication unit 312 sends to the base station 200 a location registration area update notification including the identifier of the added or deleted location registration area. The base station communication unit 312 may send the location registration area update notification using any interface that can be used between the mobility management node 300 and the base station 200 (e.g., S1-MME).

Figure 19:
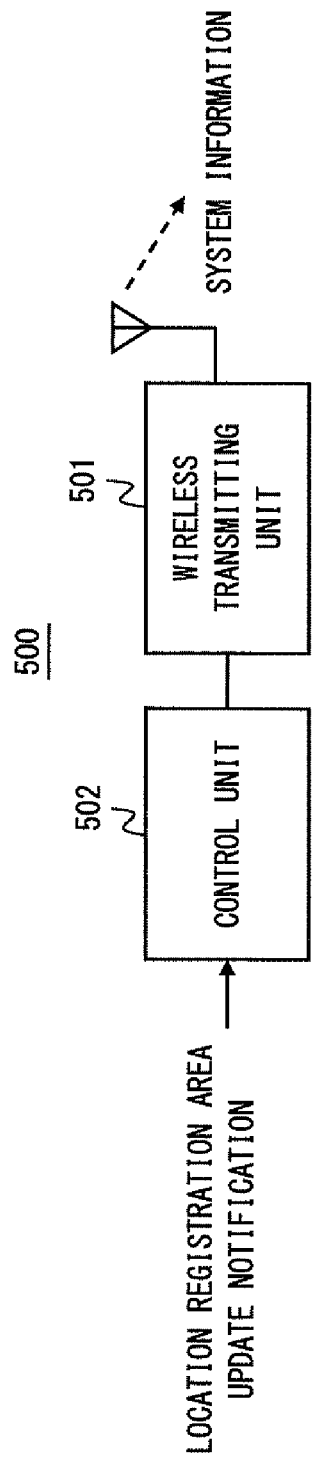
FIG. 19 is a diagram showing an illustrative configuration of a base station according to the fifth embodiment.

FIG. 19 is a block diagram showing an illustrative configuration of the base station 200 according to the present embodiment. A wireless communication unit 501 transmits downlink channels to the wireless terminal 100, and receives uplink channels transmitted from the wireless terminal 100. A control unit 502 receives a location registration area update notification from the mobility management node 300. The control unit 502 then sends to the wireless communication unit 501 the system information (location registration area information) updated according to the location registration area update notification. The wireless communication unit 501 thus transmits the system information including the updated location registration area information.

Note that, in the fourth embodiment, shown is the example in which dynamic additional setting of a location registration area is carried out in response to an attach request or a location update request from the wireless terminal 100. However, as already described, addition or deletion of a location registration area may be carried out based on other factor. For example, the mobility management node 300 according to the present embodiment may dynamically add a location registration area in response to other NAS request such as a service request (bearer request) from the wireless terminal 100. Further, the mobility management node 300 may dynamically add or delete a location registration area at any timing independently of any NAS request from the wireless terminal 100. Still further, in some examples shown in the first to third embodiments, the PA may be identical to the location registration area to which the wireless terminal 100 belongs. In those examples, a notification of the PA to the wireless terminal 100 from the mobility management node 300, that is, a notification of the location registration area may be issued in response to other NAS request other than an attach request and a location update request.

Accordingly, it is preferable that the mobility management node 300 can notify the wireless terminal 100 of the change in location registration area assignment at timing being different from attach and location update. To this end, the mobility management node 300 may trigger the wireless terminal 100 to send a location update message (e.g., a TAU request, an RAU request). Then, the mobility management node 300 may use a response message, responding to the location update message transmitted from the wireless terminal 100, to notify the wireless terminal 100 of the location registration area assignment that has been changed in accordance with addition or deletion of a location registration area. Thus, the mobility management node 300 can quickly notify the wireless terminal 100 of the change in the location registration area assignment. The message for triggering the wireless terminal 100 to send a location update message may be an NAS message that is transmitted from the mobility management node 300 after receipt of a service request, a session request, or a bearer request (e.g., Service Request, PDN Connectivity Request, Bearer Resource Allocation Request, Bearer Resource Modification Request) from the wireless terminal 100, e.g., a response message to a service request, a session request, or a bearer request.

Further, the message for triggering the wireless terminal 100 to send a location update message may include an identifier of the mobility management node 300 that is the destination of the location update message to be sent. Thus, the mobility management node 300 can request the wireless terminal 100 to send a location update message to a mobility management node other than the mobility management node 300 itself. This is effective when the mobility management node 300 that manages the current location registration area of the wireless terminal 100 and the mobility management node 300 that manages the location registration area newly assigned to the wireless terminal 100 are different from each other.

According to the present embodiment, the base station 200 can be notified of dynamic update (addition or deletion) of a location registration area by the mobility management node 300, and dynamic update of the location registration area can be reflected in the system information broadcasted by the base station 200.

Other Embodiments

The first to fourth embodiments described may be appropriately combined.

In the first to fifth embodiments, examples have been shown in which the mobility management node 300 makes a determination of a PA (including a determination of a location registration area). However, a determination of a PA (including a determination of a location registration area) may be performed by a node other than the mobility management node 300. For example, a determination of a PA may be performed by other network node arranged at the upper network 30 or by a network management system.

The processing for determining a PA described in the first to fourth embodiments may be implemented by using a semiconductor processing device including an ASIC (Application Specific Integrated Circuit). Further, the processing may be implemented by causing a computer system including at least one processor (e.g., a microprocessor, an MPU or a DSP (Digital Signal Processor)) to execute a program. More specifically, one or more programs including instructions for causing a computer system to perform the algorithms for determining a PA described with reference to the flowcharts and sequence diagrams may be created and supplied to a computer system. The control for updating a location registration area, performed by the mobility management node 300 and the base station 200, described in the fifth embodiment may also be implemented by causing a computer system to execute a program.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Furthermore, the embodiments stated above are merely examples of application of the technical ideas obtained by the present inventor. Needless to say, these technical ideas are not limited to those described in the above embodiments and the reference embodiment, and may be changed in various ways.

For example, the whole or part of the illustrative embodiments disclosed above can be described as, but not limited to, the following supplementary notes.

(Supplementary Note A1)

A paging control apparatus including a determination unit configured to determine a paging area of a wireless terminal based on an external network with which the wireless terminal communicates through a radio access network and a core network.

(Supplementary Note A2)

The apparatus according to Supplementary Note A1, in which the determination unit determines, when the external network is a first network for low mobility, a first paging area covering a smaller geographical region as compared to a case where the external network is not the first network.

(Supplementary Note A3)

The apparatus according to Supplementary Note A1 or A2, in which the determination unit determines the paging area based on identification information that is indicative of the external network and is received from the wireless terminal or a subscriber server.

(Supplementary Note A4)

The apparatus according to Supplementary Note A3, in which the determination unit determines, when the identification information indicates a first network for low mobility, a first paging area covering a smaller geographical region as compared to a case where the identification information indicates a network other than the first network.

(Supplementary Note A5)

The apparatus according to Supplementary Note A3 or A4, in which the identification information includes an APN (Access Point Name).

(Supplementary Note A6)

The apparatus according to Supplementary Note A2 or A4, in which the first paging area includes a cell or sector where the wireless terminal was located last, and a cell or sector adjacent thereto.

(Supplementary Note A7)

The apparatus according to any one of Supplementary Notes A1 to A6, in which the determination unit determines the paging area by using a paging area determining algorithm determined based on the external network.

(Supplementary Note A8)

The apparatus according to any one of Supplementary Notes A1 to A7, in which the determination unit operates, in response to reception of an attach request message or a location update message from the wireless terminal, to newly set a first location registration area including a cell or sector through which the attach request message or the location update message was transmitted, and to notify the wireless terminal of the first location registration area, and the first location registration area corresponds to the paging area.

(Supplementary Note A9)

The apparatus according to any one of Supplementary Notes A1 to A7, in which the determination of the paging area is made by determining a location registration area to be assigned to the wireless terminal.

(Supplementary Note A10)

The apparatus according to any one of Supplementary Notes A1 to A7, in which the determination of the paging area is made by selecting at least one base station or cell from a plurality of base stations or cells included in the location registration area assigned to the wireless terminal.

(Supplementary Note A11)

A paging method including transmitting a paging message addressed to a wireless terminal to a paging area determined based on an external network with which the wireless terminal communicates through a radio access network and a core network.

(Supplementary Note A12)

The method according to Supplementary Note A11, in which the transmitting includes, when the external network is a first network for low mobility, transmitting the paging message to a first paging area covering a smaller geographical region as compared to a case where the external network is not the first network.

(Supplementary Note A13)

The method according to Supplementary Note A11 or A12, in which the paging area is determined based on identification information that is indicative of the external network and is received from the wireless terminal or a subscriber server.

(Supplementary Note A14)

The method according to Supplementary Note A13, in which the transmitting includes, when the identification information indicates a first network for low mobility, transmitting the paging message to a first paging area covering a smaller geographical region as compared to a case where the identification information indicates a network other than the first network.

(Supplementary Note A15)

The method according to Supplementary Note A13 or A14, in which the identification information includes an APN (Access Point Name).

(Supplementary Note A16)

The method according to Supplementary Note A12 or A14, in which the first paging area includes a cell or sector where the wireless terminal was located last, and a cell or sector adjacent thereto.

(Supplementary Note A17)

The method according to any one of Supplementary Notes A11 to A16, further including determining the paging area by using a paging area determining algorithm determined based on the external network.

(Supplementary Note A18)

The method according to any one of Supplementary Notes A11 to A17, further including:

newly setting, in response to reception of an attach request message or a location update message from the wireless terminal, a first location registration area including a cell or sector through which the attach request message or the location update message was transmitted; and notifying the wireless terminal of the first location registration area, in which the first location registration area corresponds to the paging area.

(Supplementary Note A19)

A non-transitory computer-readable medium storing a program for causing a computer to perform a paging control method, the paging control method including determining a paging area of a wireless terminal based on an external network with which the wireless terminal communicates through a radio access network and a core network.

(Supplementary Note A20)

A wireless terminal that is used in combination with the paging control apparatus according to any one of Supplementary Notes A1 to A10, the wireless terminal being configured to initiate communication in response to a paging message transmitted from the paging control apparatus.

(Supplementary Note B1)

A paging control apparatus including a determination unit configured to acquire subscriber data containing low-mobility information of a wireless terminal from a subscriber server, and determines a paging area of the wireless terminal based on the low-mobility information.

(Supplementary Note B2)

The apparatus according to Supplementary Note B1, in which the low-mobility information indicates whether or not the wireless terminal is in low mobility.

(Supplementary Note B3)

The apparatus according to Supplementary Note B1 or B2, in which the determination unit determines, when the wireless terminal is determined as being in low mobility, a first paging area covering a smaller geographical region as compared to a case where the wireless terminal is not in low mobility.

(Supplementary Note B4)

The apparatus according to Supplementary Note B1, in which the low-mobility information includes identification information of an external network with which the wireless terminal communicates through a radio access network and a core network.

(Supplementary Note B5)

The apparatus according to Supplementary Note B4, in which the determination unit determines, when the identification information indicates a first network for low mobility, a first paging area covering a smaller geographical region as compared to a case where the identification information indicates a network other than the first network.

(Supplementary Note B6)

The apparatus according to Supplementary Note B3 or B5, in which the first paging area includes a cell or sector where the wireless terminal was located last, and a cell or sector adjacent thereto.

(Supplementary Note B7)

The apparatus according to any one of Supplementary Notes B1 to B6, in which the determination unit uses determines the paging area by using a paging area determining algorithm determined based on the low-mobility information.

(Supplementary Note B8)

The apparatus according to any one of Supplementary Notes B1 to B7, in which the determination unit operates, in response to reception of an attach request message or a location update message from the wireless terminal, to newly set a first location registration area including a cell or sector through which the attach request message or the location update message was transmitted, and to notify the wireless terminal of the first location registration area, and the first location registration area corresponds to the paging area.

(Supplementary Note B9)

The apparatus according to any one of Supplementary Notes B1 to B7, in which the determination of the paging area is made by determining a location registration area to be assigned to the wireless terminal.

(Supplementary Note B10)

The apparatus according to any one of Supplementary Notes B1 to B7, in which the determination of the paging area is made by selecting at least one base station or cell from a plurality of base stations or cells included in the location registration area assigned to the wireless terminal.

(Supplementary Note B11)

A paging method including acquiring subscriber data containing low-mobility information of a wireless terminal from a subscriber server, and transmitting a paging message addressed to the wireless terminal to a paging area determined based on the low-mobility information.

(Supplementary Note B12)

The method according to Supplementary Note B11, in which the low-mobility information indicates whether or not the wireless terminal is in low mobility.

(Supplementary Note B13)

The method according to Supplementary Note B11 or B12, in which the transmitting includes, when the wireless terminal is determined as being in low mobility, transmitting the paging message to a first paging area covering a smaller geographical region as compared to a case where the wireless terminal is not in low mobility.

(Supplementary Note B14)

The method according to Supplementary Note B11, in which the low-mobility information includes identification information of an external network with which the wireless terminal communicates through a radio access network and a core network.

(Supplementary Note B15)

The method according to Supplementary Note B14, in which the transmitting includes, when the identification information indicates a first network for low mobility, transmitting the paging message to a first paging area covering a smaller geographical region as compared to a case where the identification information indicates a network other than the first network.

(Supplementary Note B16)

The method according to Supplementary Note B13 or B15, in which the first paging area includes a cell or sector where the wireless terminal was located last, and a cell or sector adjacent thereto.

(Supplementary Note B17)

The method according to any one of Supplementary Notes B11 to B16, further including determining the paging area by using a paging area determining algorithm determined based on the low-mobility information.

(Supplementary Note B18)

The method according to any one of Supplementary Notes B11 to B17, further including:

newly setting, in response to reception of an attach request message or a location update message from the wireless terminal, a first location registration area including a cell or sector through which the attach request message or the location update message was transmitted; and notifying the wireless terminal of the first location registration area, in which the first location registration area corresponds to the paging area.

(Supplementary Note B19)

A program for causing a computer to execute a paging control method, the method including:

acquiring subscriber data containing low-mobility information of a wireless terminal from a subscriber server; and determining a paging area of the wireless terminal based on the low-mobility information.

(Supplementary Note B20)

A wireless terminal that is used in combination with the paging control apparatus according to any one of Supplementary Notes B1 to B10, the wireless terminal being configured to initiate communication in response to a paging message transmitted from the paging control apparatus.

(Supplementary Note C1)

A paging control apparatus including a determination unit configured to determine, when a wireless terminal is determined as being in low mobility, a paging area covering a smaller geographical region as compared to a case where the wireless terminal is not in low mobility, in which the paging area includes a cell or sector where the wireless terminal was located last, and a cell or sector adjacent thereto.

(Supplementary Note C2)

The apparatus according to Supplementary Note C1, in which the cell where the wireless terminal was located last is a cell where the wireless terminal transmitted an attach request message, or a cell where the wireless terminal transmitted a location update message.

(Supplementary Note C3)

The apparatus according to Supplementary Note C1 or C2, in which the determination unit operates, in response to reception of the attach request message or the location update message from the wireless terminal, to newly set a first location registration area including the cell or sector through which the attach request message or the location update message was transmitted, and to notify the wireless terminal of the first location registration area, and the first location registration area corresponds to the paging area.

(Supplementary Note C4)

The apparatus according to Supplementary Note C3, further including a transmitting unit configured to transmit a paging message addressed to the wireless terminal to the first location registration area.

(Supplementary Note C5)

The apparatus according to any one of Supplementary Notes C1 to C4, in which the determination unit determines whether or not the wireless terminal is in low mobility based on an external network with which the wireless terminal communicates through a radio access network and a core network.

(Supplementary Note C6)

The apparatus according to Supplementary Note C5, in which the determination unit determines that the wireless terminal is in low mobility when the external network is a first network for low mobility.

(Supplementary Note C7)

The apparatus according to any one of Supplementary Notes C1 to C4, in which the determination unit acquires subscriber data containing low-mobility information of the wireless terminal from a subscriber server, and determines whether or not the wireless terminal is in low mobility based on the low-mobility information.

(Supplementary Note C8)

The apparatus according to Supplementary Note C7, in which the low-mobility information includes identification information of an external network with which the wireless terminal communicates through a radio access network and a core network.

(Supplementary Note C9)

A paging method including transmitting, when a wireless terminal is determined as being in low mobility, a paging message addressed to the wireless terminal to a paging area covering a smaller geographical region as compared to a case where the wireless terminal is not in low mobility, in which the paging area includes a cell or sector where the wireless terminal was located last, and a cell or sector adjacent thereto.

(Supplementary Note C10)

The method according to Supplementary Note C9, in which the cell where the wireless terminal was located last is a cell where the wireless terminal transmitted an attach request message, or a cell where the wireless terminal transmitted a location update message.

(Supplementary Note C11)

The method according to Supplementary Note C9 or C10, further including:

newly setting, in response to reception of the attach request message or the location update message from the wireless terminal, a first location registration area including the cell or sector through which the attach request message or the location update message was transmitted; and notifying the wireless terminal of the first location registration area, in which the first location registration area corresponds to the paging area.

(Supplementary Note C12)

The method according to Supplementary Note C11, in which the transmitting includes transmitting the paging message addressed to the wireless terminal to the first location registration area.

(Supplementary Note C13)

The method according to any one of Supplementary Notes C9 to C12, further including determining whether or not the wireless terminal is in low mobility based on an external network with which the wireless terminal communicates through a radio access network and a core network.

(Supplementary Note C14)

The method according to Supplementary Note C13, in which the determining includes determining that the wireless terminal is in low mobility when the external network is a first network for low mobility.

(Supplementary Note C15)

The method according to any one of Supplementary Notes C9 to C12, further including:

acquiring subscriber data containing low-mobility information of the wireless terminal from a subscriber server; and determining whether or not the wireless terminal is in low mobility based on the low-mobility information.

(Supplementary Note C16)

The method according to Supplementary Note C15, in which the low-mobility information includes identification information of an external network with which the wireless terminal communicates through a radio access network and a core network.

(Supplementary Note C17)

A program for causing a computer to execute a paging control method, the method including determining, when a wireless terminal is determined as being in low mobility, a paging area covering a smaller geographical region as compared to a case where the wireless terminal is not in low mobility, in which the paging area includes a cell or sector where the wireless terminal was located last, and a cell or sector adjacent thereto.

(Supplementary Note C18)

A wireless terminal that is used in combination with the paging control apparatus according to any one of Supplementary Notes C1 to C8, the wireless terminal being configured to initiate communication in response to a paging message transmitted from the paging control apparatus.

(Supplementary Note D1)

A paging control apparatus including:

a setting unit configured to newly set, in response to an attach request message or a location update message from a wireless terminal, a first location registration area including a cell or sector through which the attach request message or the location update message was transmitted, and to notify the wireless terminal of the first location registration area; and a transmitting unit configured to transmit a paging message addressed to the wireless terminal to the first location registration area.

(Supplementary Note D2)

The apparatus according to Supplementary Note D1, in which the setting unit sets the first location registration area when the wireless terminal is determined as being in low mobility.

(Supplementary Note D3)

The apparatus according to Supplementary Note D2, in which the setting unit notifies the wireless terminal of a second location registration area when the wireless terminal is determined as being not in low mobility, in which the second location registration area is previously statically configured and covers a larger geographical region than the first location registration area.

(Supplementary Note D4)

The apparatus according to one of Supplementary Notes D1 to D3, in which the first location registration area includes the cell or sector through which the attach request message or the location update message was transmitted, and a cell or sector adjacent thereto.

(Supplementary Note D5)

The apparatus according to Supplementary Note D2, D3, or Supplementary Note D4 depending from Supplementary Note D2 or D3, in which the setting unit determines whether or not the wireless terminal is in low mobility based on an external network with which the wireless terminal communicates through a radio access network and a core network.

(Supplementary Note D6)

The apparatus according to Supplementary Note D5, in which the setting unit determines that the wireless terminal is in low mobility when the external network is a first network for low mobility.

(Supplementary Note D7)

The apparatus according to Supplementary Note D2, D3, or Supplementary Note D4 depending from Supplementary Note D2 or D3, in which the setting unit acquires subscriber data containing low-mobility information of the wireless terminal from a subscriber server, and determines whether or not the wireless terminal is in low mobility based on the low-mobility information.

(Supplementary Note D8)

The apparatus according to Supplementary Note D7, in which the low-mobility information includes identification information of an external network with which the wireless terminal communicates through a radio access network and a core network.

(Supplementary Note D9)

A paging method including:

newly setting, in response to reception of an attach request message or a location update message from a wireless terminal, a first location registration area including a cell or sector through which the attach request message or the location update message was transmitted;

notifying the wireless terminal of the first location registration area; and transmitting a paging message addressed to the wireless terminal to the first location registration area.

(Supplementary Note D10)

The method according to Supplementary Note D9, in which the setting includes setting the first location registration area when the wireless terminal is determined as being in low mobility.

(Supplementary Note D11)

The method according to Supplementary Note D10, further including notifying a second location registration area when the wireless terminal is determined as being not in low mobility, in which the second location registration area is previously statically configured and covers a larger geographical region than the first location registration area.

(Supplementary Note D12)

The method according to any one of Supplementary Notes D9 to D11, in which the first location registration area includes the cell or sector through which the attach request message or the location update message was transmitted, and a cell or sector adjacent thereto.

(Supplementary Note D13)

The method according to Supplementary Note D10, D11, or Supplementary Note D12 depending from Supplementary Note D10 or D11, further including determining whether or not the wireless terminal is in low mobility based on an external network with which the wireless terminal communicates through a radio access network and a core network.

(Supplementary Note D14)

The method according to Supplementary Note D13, in which the determining includes determining that the wireless terminal is in low mobility when the external network is a first network for low mobility.

(Supplementary Note D15)

The method according to Supplementary Note D10, D11, or Supplementary Note D12 depending from Supplementary Note D10 or D11, further including:

acquiring subscriber data containing low-mobility information of the wireless terminal from a subscriber server; and determining whether or not the wireless terminal is in low mobility based on the low-mobility information.

(Supplementary Note D16)

The method according to Supplementary Note D15, in which the low-mobility information includes identification information of an external network with which the wireless terminal communicates through a radio access network and a core network.

(Supplementary Note D17)

A program for causing a computer to execute a paging method, the method including:

newly setting, in response to reception of an attach request message or a location update message from a wireless terminal, a first location registration area including a cell or sector through which the attach request message or the location update message was transmitted;

notifying the wireless terminal of the first location registration area; and transmitting a paging message addressed to the wireless terminal to the first location registration area.

(Supplementary Note D18)

A wireless terminal that is used in combination with the paging control apparatus according to any one of Supplementary Notes D1 to D8, the wireless terminal being configured to initiate communication in response to a paging message transmitted from the paging control apparatus.

(Supplementary Note E1)

A base station including:

a receiving unit configured to receive an identifier of a dynamically added or deleted location registration area from a mobility management node; and a wireless transmitting unit configured to broadcast location registration area information updated based on the identifier.

(Supplementary Note E2)

The base station according to Supplementary Note E1, in which when a first identifier of a dynamically added first location registration area is received, the wireless transmitting unit broadcasts the location registration area information containing the first identifier.

(Supplementary Note E3)

The base station according to Supplementary Note E1 or E2, in which when a second identifier of a dynamically deleted second location registration area is received, the wireless transmitting unit broadcasts the location registration area information from which the second identifier has been deleted.

(Supplementary Note E4)

A mobility management node including a transmitting unit configured to transmit an identifier of a dynamically added or deleted location registration area to a base station that manages a cell included in the location registration area.

(Supplementary Note E5)

The mobility management node according to Supplementary Note E4, further including a setting unit configured to determine addition or deletion of the location registration area.

(Supplementary Note E6)

The mobility management node according to Supplementary Note E5, in which the setting unit additionally sets, in response to reception of an attach request message or a location update message from a wireless terminal, a first location registration area including a cell or sector through which the attach request message or the location update message was transmitted.

(Supplementary Note E7)

The mobility management node according to Supplementary Note E6, in which the transmitting unit transmits a first identifier of the first location registration area to a base station managing a cell included in the first location registration area.

(Supplementary Note E8)

The mobility management node according to Supplementary Note E7, in which the setting unit notifies the wireless terminal of the first identifier by using an NAS (Non-Access Stratum) message.

(Supplementary Note E9)

The mobility management node according to Supplementary Note E5, in which the setting unit notifies the wireless terminal of a change in the location registration area assigned to the wireless terminal.

(Supplementary Note E10)

The mobility management node according to Supplementary Note E9, in which the setting unit triggers the wireless terminal to transmit a location update message, and notifies the wireless terminal of the change in the location registration area assigned to the wireless terminal in a response to the location update message.

(Supplementary Note E11)

The mobility management node according to any one of Supplementary Notes E4 to E10, further including a transmitting unit configured to transmit a trigger message for triggering the wireless terminal to transmit a location update message, in which the trigger message includes an identifier of other mobility management node being a destination of the location update message.

(Supplementary Note E12)

A method, performed by a base station, for controlling a location registration area, the method including:

receiving an identifier of a dynamically added or deleted location registration area from a mobility management node; and broadcasting location registration area information updated based on the identifier.

(Supplementary Note E13)

The method according to Supplementary Note E12, in which the broadcasting includes, when a first identifier of a dynamically added first location registration area is received, broadcasting the location registration area information containing the first identifier.

(Supplementary Note E14)

The method according to Supplementary Note E12 or E13, in which the broadcasting includes, when a second identifier of a dynamically deleted second location registration area is received, broadcasting the location registration area information from which the second identifier has been deleted.

(Supplementary Note E15)

A method, performed by a mobility management node, for controlling a location registration area, the method including transmitting an identifier of a dynamically added or deleted location registration area to a base station that manages a cell included in the location registration area.

(Supplementary Note E16)

The method according to Supplementary Note E15, further including determining addition or deletion of the location registration area.

(Supplementary Note E17)

The method according to Supplementary Note E16, in which the determining includes additionally setting, in response to reception of an attach request message or a location update message from a wireless terminal, a first location registration area including a cell or sector through which the attach request message or the location update message was transmitted.

(Supplementary Note E18)

The method according to Supplementary Note E17, in which the transmitting includes transmitting a first identifier of the first location registration area to a base station managing a cell included in the first location registration area.

(Supplementary Note E19)

The method according to Supplementary Note E18, further including notifying the wireless terminal of the first identifier by using an NAS (Non-Access Stratum) message.

(Supplementary Note E20)

The method according to Supplementary Note E16, further including notifying a wireless terminal of a change in the location registration area assigned to the wireless terminal.

(Supplementary Note E21)

The method according to Supplementary Note E20, further including triggering the wireless terminal to transmit a location update message, in which the notifying includes notifying of a change in the location registration area assigned to the wireless terminal in a response to the location update message.

(Supplementary Note E22)

The method according to any one of Supplementary Notes E15 to E21, further including transmitting a trigger message for triggering the wireless terminal to transmit a location update message, in which the trigger message includes an identifier of other mobility management node being a destination of the location update message.

(Supplementary Note E23)

A program for causing a computer to perform a method, regarding a base station, for controlling a location registration area, the method including:

receiving an identifier of a dynamically added or deleted location registration area from a mobility management node; and broadcasting location registration area information updated based on the identifier.

(Supplementary Note E24)

A program for causing a computer to execute a method, regarding a mobility management node, for controlling a location registration area, the method including transmitting an identifier of a dynamically added or deleted location registration area to a base station that manages a cell included in the location registration area.

This application is based upon and claims the benefit of priority from Japanese Patent Application No. 2012-161407 filed on Jul. 20, 2012, and the disclosure of which is incorporated herein in its entirety by reference.

REFERENCE SIGNS LIST

1 RADIO COMMUNICATION SYSTEM
9 EXTERNAL NETWORK
30 UPPER NETWORK
100 WIRELESS TERMINAL
200 BASE STATION
210 CELL (or SECTOR)
300 MOBILITY MANAGEMENT NODE
301 PAGING CONTROL UNIT
302 PAGING TRANSMITTING UNIT
310 TRANSFER NODE
320 SUBSCRIBER SERVER
501 WIRELESS COMMUNICATION UNIT
502 CONTROL UNIT

The invention claimed is:

1. A mobility management node comprising:
a memory that stores a set of instructions; and
at least one hardware processor configured to execute the set of instructions to:
receive information indicating a Software Version Number (SVN) from a wireless terminal;
determine a first mobility level of the wireless terminal based on the SVN, the first mobility level indicating that the wireless terminal is in low mobility;
determine, for the wireless terminal in the low mobility, a paging area that includes a cell where the wireless terminal was last located and a cell adjacent thereto; and applying a first paging algorithm to page the wireless terminal for the first mobility level in the determined paging area.

2. The mobility management node according to claim 1, wherein the first paging algorithm includes whether to page the wireless terminal first in a last known tracking area of registered tracking areas for the wireless terminal and then page the wireless terminal in a plurality of the registered tracking areas.

3. The mobility management node according to claim 2, wherein the at least one hardware processor is further configured to execute instructions to:
determine a second mobility level of the wireless terminal according to a second service type; and
determine a second paging algorithm different from the first paging algorithm based on the second mobility level.

4. The mobility management node according to claim 1, wherein the at least one hardware processor is further configured to execute instructions to configure the first paging algorithm for Access Point Name (APN).

5. The mobility management node according to claim 4, further comprising a transceiver configured to:
communicate with a subscriber server;
receive, from the subscriber server, a message including information related to the APN, wherein the message is a response to a location update message.

6. The mobility management node according to claim 5, wherein the location update message is one of: a tracking area update request message, a routing area update request message, or an Update Location Request message.

7. The mobility management node according to claim 4, wherein information related to the APN is transmitted by the wireless terminal.

8. A radio base station comprising a transceiver configured to:
communicate with a mobility management node; and
receive a paging message from the mobility management node,
wherein a firs paging algorithm is applied to page a wireless terminal for a first mobility level in a paging area, determined by the mobility management node, that includes a cell where the wireless terminal was last located and a cell adjacent thereto, and
wherein the first mobility level of the wireless terminal is determined based on a Software Version Number (SVN) received by the mobility management node from the wireless terminal, the first mobility level indicating that the wireless terminal is in low mobility according to a first service type.

9. The radio base station according to claim 8, wherein the first paging algorithm is configured for Access Point Name (APN).

10. The radio base station according to claim 9, wherein a message including information related to the APN is transmitted from a subscriber server to the mobility management node,
wherein the message is a response to a location update message.

11. The radio base station according to claim 10, wherein the location update message is one of: a tracking area update request message, a routing area update request message, or an Update Location Request message.

12. The radio base station according to claim 9, wherein information related to the APN is transmitted by the wireless terminal.

13. The radio base station according to claim 8,
wherein the first paging algorithm includes whether to page the wireless terminal first in a last known tracking area of registered tracking areas for the wireless terminal and then page the wireless terminal in a plurality of the registered tracking areas.

14. The radio base station according to claim 8, wherein a second mobility level of the wireless terminal is determined according to a second service type; and
a second paging algorithm different from the first paging algorithm is determined based on the second mobility level.

15. A wireless terminal comprising:
a transceiver configured to communicate with a radio base station and to transmit information indicating a Software Version Number (SVN) to a mobility management node; and
a control unit configured to initiate communication upon reception of a paging message from the mobility management node through the radio base station,
wherein a first paging algorithm is applied to page the wireless terminal for a first mobility level in a paging area, determined by the mobility management node, that includes a cell where the wireless terminal was last located and a cell adjacent thereto, and
wherein the first mobility level of the wireless terminal is determined based on the SVN, the mobility level indicating that the wireless terminal is in low mobility.

16. The wireless terminal according to claim 15,
wherein the first paging algorithm includes whether to page the wireless terminal first in a last known tracking area of registered tracking areas for the wireless terminal and then page the wireless terminal in a plurality of the registered tracking areas.

17. The wireless terminal according to claim 15,
wherein the first paging algorithm is configured for Access Point Name (APN).

18. The wireless terminal according to claim 17,
wherein a message including information related to the APN is transmitted from a subscriber server to the mobility management node,
wherein the message is a response to a location update message.

19. The wireless terminal according to claim 18, wherein the location update message is one of: a tracking area update request message, a routing area update request message, or an Update Location Request message.

20. The wireless terminal according to claim 17, wherein information related to the APN is transmitted by the wireless terminal.

* * * * *